United States Patent
Lee et al.

(10) Patent No.: US 12,513,774 B2
(45) Date of Patent: Dec. 30, 2025

(54) DISCONTINUOUS RECEPTION CYCLE PERIODICITY

(71) Applicant: QUALCOMM Incorporated, San Diego, CA (US)

(72) Inventors: Hyun Yong Lee, San Diego, CA (US); Linhai He, San Diego, CA (US); Prashanth Haridas Hande, San Diego, CA (US); Yuchul Kim, San Diego, CA (US); Mickael Mondet, Louannec (FR); Peerapol Tinnakornsrisuphap, San Diego, CA (US); Rajat Prakash, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/816,837

(22) Filed: Aug. 2, 2022

(65) Prior Publication Data
US 2023/0051778 A1 Feb. 16, 2023

Related U.S. Application Data

(60) Provisional application No. 63/233,155, filed on Aug. 13, 2021.

(51) Int. Cl.
*H04W 76/28* (2018.01)
*H04W 72/12* (2023.01)

(52) U.S. Cl.
CPC ........... *H04W 76/28* (2018.02); *H04W 72/12* (2013.01)

(58) Field of Classification Search
CPC .. H04W 76/28; H04W 72/12; H04W 52/0216
USPC .......................................... 370/311
See application file for complete search history.

(56) References Cited

U.S. PATENT DOCUMENTS

| | | | |
|---|---|---|---|
| 2010/0195605 A1* | 8/2010 | Suzuki | H04W 76/28 370/329 |
| 2019/0053159 A1* | 2/2019 | Wei | H04W 52/0235 |
| 2019/0335528 A1* | 10/2019 | Bin Sediq | H04W 76/28 |
| 2020/0037396 A1* | 1/2020 | Islam | H04W 52/0229 |
| 2020/0389933 A1 | 12/2020 | Ang et al. | |
| 2021/0014927 A1* | 1/2021 | Tang | H04W 76/27 |
| 2021/0314914 A1* | 10/2021 | Agiwal | H04W 76/28 |
| 2024/0172322 A1* | 5/2024 | Chen | H04W 52/0229 |
| 2024/0215107 A1* | 6/2024 | Fu | H04W 52/0229 |

OTHER PUBLICATIONS

International Search Report and Written Opinion—PCT/US2022/074465—ISA/EPO—Nov. 18, 2022.

\* cited by examiner

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a configuration for a discontinuous reception (DRX) cycle periodicity, the indication including a selection of a non-integer number for the DRX cycle periodicity. The UE may receive one or more communications based at least in part on the configuration for the DRX cycle periodicity. Numerous other aspects are described.

30 Claims, 13 Drawing Sheets

DISCONTINUOUS RECEPTION CYCLE PERIODICITY

CROSS-REFERENCE TO RELATED APPLICATION

This Patent application claims priority to U.S. Provisional Patent Application No. 63/233,155, filed on Aug. 13, 2021, entitled "DISCONTINUOUS RECEPTION CYCLE PERIODICITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for discontinuous reception cycle periodicity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a configuration for a discontinuous reception (DRX) cycle periodicity, the indication including a selection of a non-integer number for the DRX cycle periodicity. The method may include receiving one or more communications based at least in part on the configuration for the DRX cycle periodicity.

Some aspects described herein relate to a method of wireless communication performed by a network node. The method may include transmitting an indication of a configuration for a DRX cycle periodicity, the indication including a selection of a non-integer number for the DRX cycle periodicity. The method may include transmitting one or more communications based at least in part on the configuration for the DRX cycle periodicity.

Some aspects described herein relate to a UE for wireless communication. The user equipment may include a memory and one or more processors coupled to the memory. The memory may comprise instructions executable by the one or more processors to cause the UE to receive an indication of a configuration for a DRX cycle periodicity, the indication including a selection of a non-integer number for the DRX cycle periodicity. The memory may comprise instructions executable by the one or more processors to cause the UE to receive one or more communications based at least in part on the configuration for the DRX cycle periodicity.

Some aspects described herein relate to a network node for wireless communication. The network node may include a memory and one or more processors coupled to the memory. The memory may comprise instructions executable by the one or more processors to cause the network node to transmit an indication of a configuration for a DRX cycle periodicity, the indication including a selection of a non-integer number for the DRX cycle periodicity. The memory may comprise instructions executable by the one or more processors to cause the network node to transmit one or more communications based at least in part on the configuration for the DRX cycle periodicity.

Some aspects described herein relate to a non-transitory computer-readable medium that stores a set of instructions for wireless communication by a UE. The set of instructions, when executed by one or more processors of the UE, may cause the UE to receive an indication of a configuration for a DRX cycle periodicity, the indication including a selection of a non-integer number for the DRX cycle periodicity. The set of instructions, when executed by one or more processors of the UE, may cause the UE to receive one or more communications based at least in part on the configuration for the DRX cycle periodicity.

Some aspects described herein relate to a non-transitory computer-readable medium that stores a set of instructions for wireless communication by a network node. The set of instructions, when executed by one or more processors of the network node, may cause the network node to transmit an indication of a configuration for a DRX cycle periodicity, the indication including a selection of a non-integer number for the DRX cycle periodicity. The set of instructions, when executed by one or more processors of the network node, may cause the network node to transmit one or more communications based at least in part on the configuration for the DRX cycle periodicity.

Some aspects described herein relate to an apparatus for wireless communication. The apparatus may include means for receiving an indication of a configuration for a DRX cycle periodicity, the indication including a selection of a non-integer number for the DRX cycle periodicity. The apparatus may include means for receiving one or more communications based at least in part on the configuration for the DRX cycle periodicity.

Some aspects described herein relate to an apparatus for wireless communication. The apparatus may include means for transmitting an indication of a configuration for a DRX cycle periodicity, the indication including a selection of a non-integer number for the DRX cycle periodicity. The apparatus may include means for transmitting one or more communications based at least in part on the configuration for the DRX cycle periodicity.

Aspects generally include a method, apparatus, system, computer program product, non-transitory computer-readable medium, user equipment, network node, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
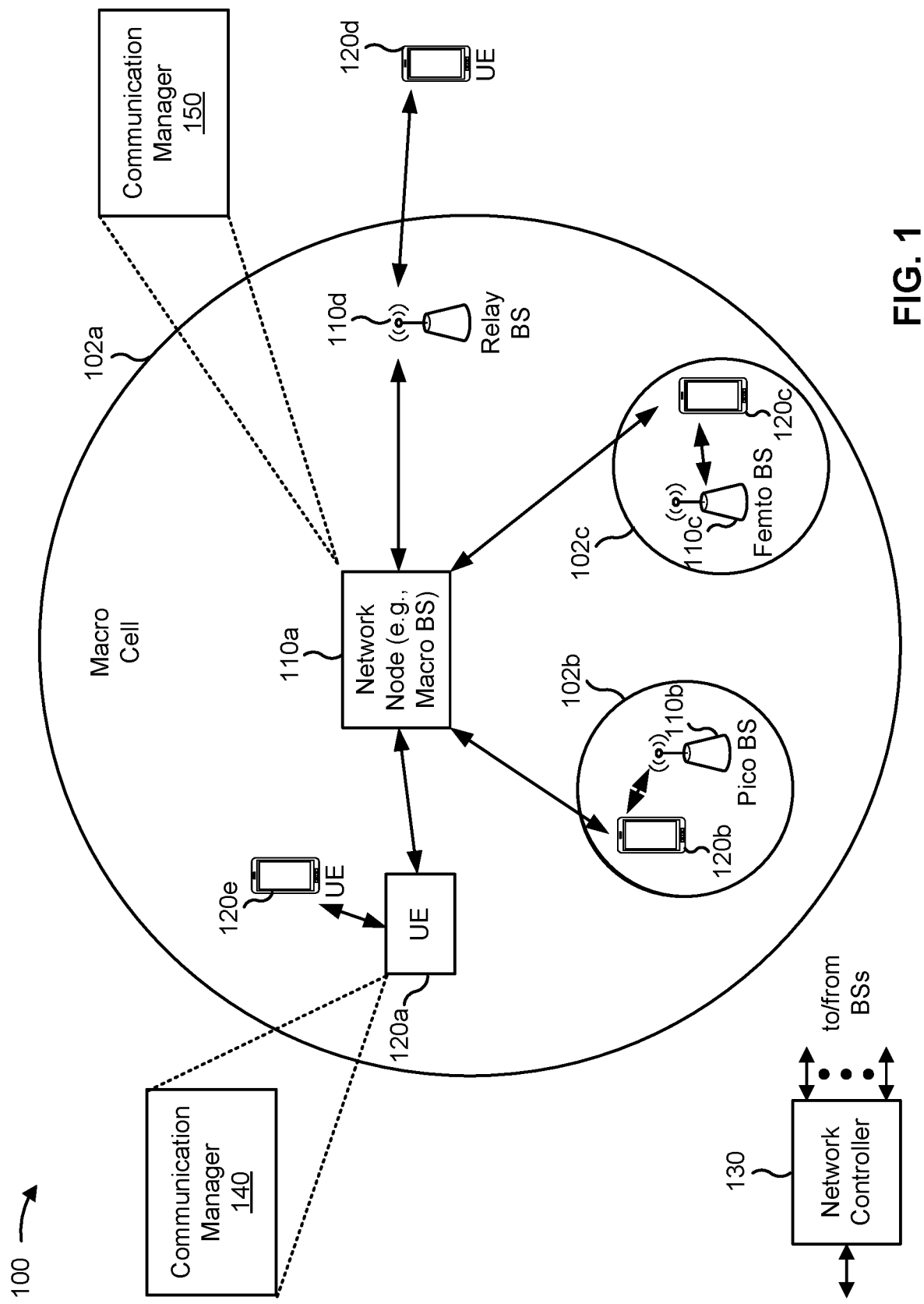
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A network node 110 is an entity that communicates with UEs 120. A network node 110 (sometimes referred to as a BS) may include, for example, an NR network node, an LTE network node, a Node B, an eNB (e.g., in 4G), a gNB (e.g., in 5G), an access point, and/or a transmission reception point (TRP). Each network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the BS 110a may be a macro network node for a macro cell 102a, the BS 110b may be a pico network node for a pico cell 102b, and the BS 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node). In some examples, the network nodes 110 may be interconnected to one another and/or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the BS 110d (e.g., a relay network node) may communicate with the network node 110a (e.g., a macro network node) and the UE 120d in order to facilitate communication between the BS 110a and the UE 120d. A network node 110 that relays communications may be referred to as a relay station, a relay network node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive an indication of a configuration for a discontinuous reception (DRX) cycle periodicity, the indication including a selection of a non-integer number for the DRX cycle periodicity; and receive one or more communications based at least in part on the configuration for the DRX cycle periodicity. Additionally, or alternatively, the communication manager 140 may perform one or more other operations described herein.

In some aspects, the network node 110 may include a communication manager 150. As described in more detail elsewhere herein, the communication manager 150 may transmit an indication of a configuration for a DRX cycle periodicity, the indication including a selection of a non-integer number for the DRX cycle periodicity; and transmit one or more communications based at least in part on the configuration for the DRX cycle periodicity. Additionally, or alternatively, the communication manager 150 may perform one or more other operations described herein.

As indicated above, FIG. 1 is provided as an example. Other examples may differ from what is described with regard to FIG. 1.

Figure 2:
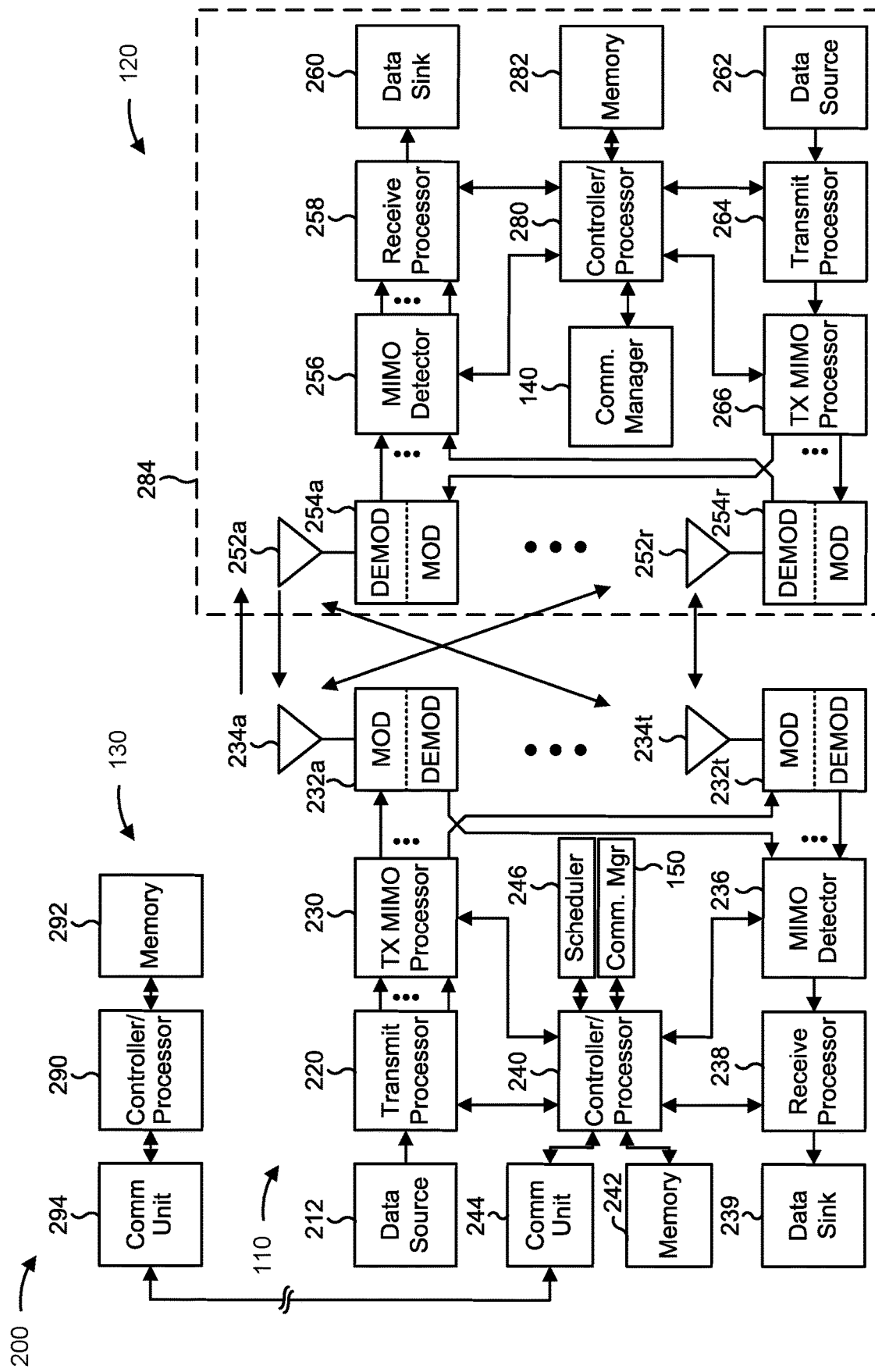
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-13).

The controller/processor 240 of the network node 110, the controller/processor 280 of the UE 120, and/or any other component(s) of FIG. 2 may perform one or more techniques associated with discontinuous reception cycle periodicity, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other aspects.

In some aspects, the UE includes means for receiving an indication of a configuration for a DRX cycle periodicity, the indication including a selection of a non-integer number for the DRX cycle periodicity; and/or means for receiving one or more communications based at least in part on the configuration for the DRX cycle periodicity. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an indication of a configuration for a DRX cycle periodicity, the indication including a selection of a non-integer number for the DRX cycle periodicity; and/or means for transmitting one or more communications based at least in part on the configuration for the DRX cycle periodicity. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
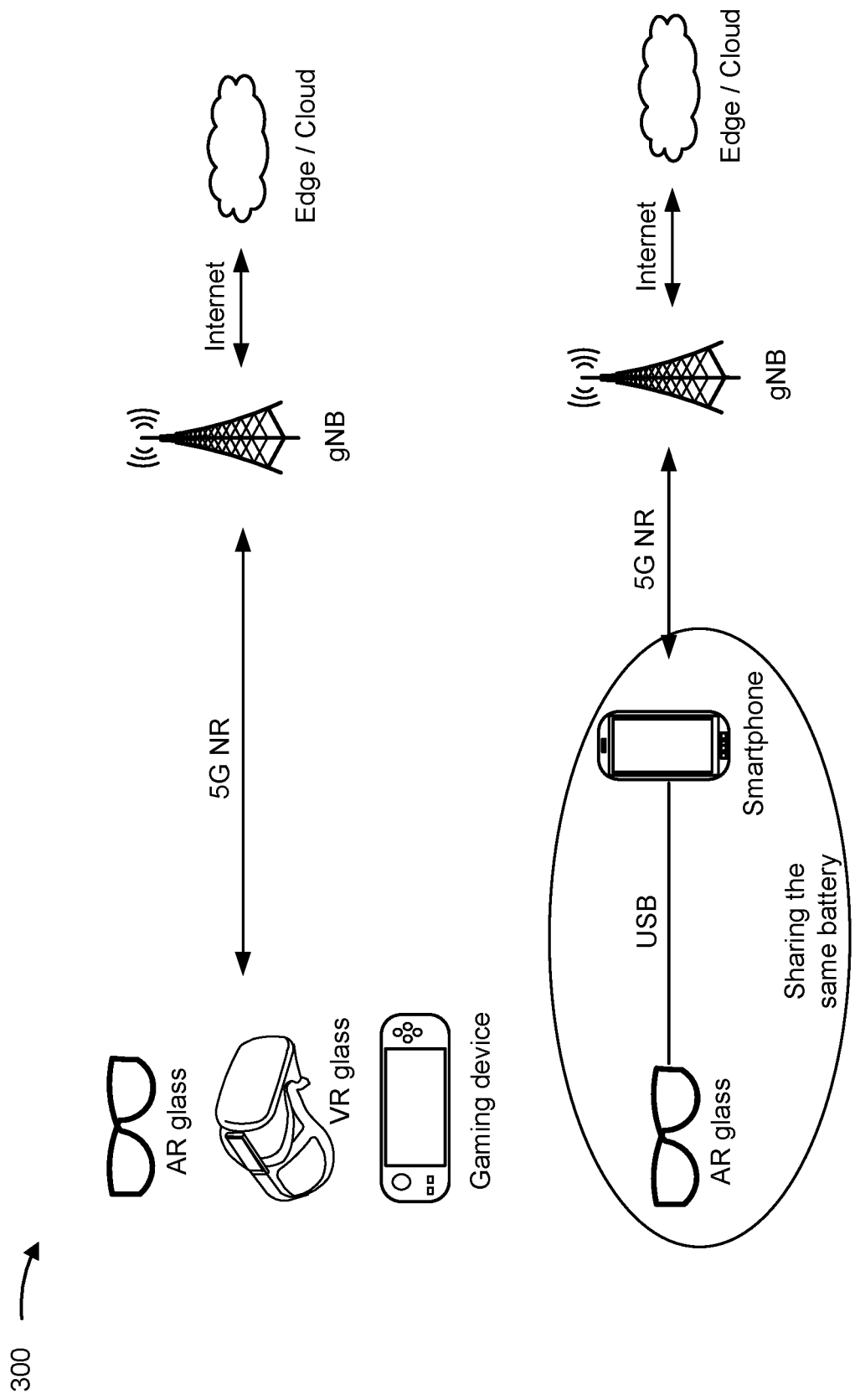
FIG. 3 is a diagram illustrating an example of devices designed for low latency applications, in accordance with the present disclosure.

FIG. 3 is a diagram illustrating an example 300 of devices designed for low latency applications, in accordance with the present disclosure.

Some devices, including devices for extended reality (XR), may require low-latency traffic to and from an edge server or a cloud environment. Example 300 shows communications between an XR device and the edge server or the cloud environment, via a network node (e.g., gNB). The XR device may be an augmented reality (AR) glass device, a virtual reality (VR) glass device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

As indicated above, FIG. 3 is provided as an example. Other examples may differ from what is described with regard to FIG. 3.

Figure 4:
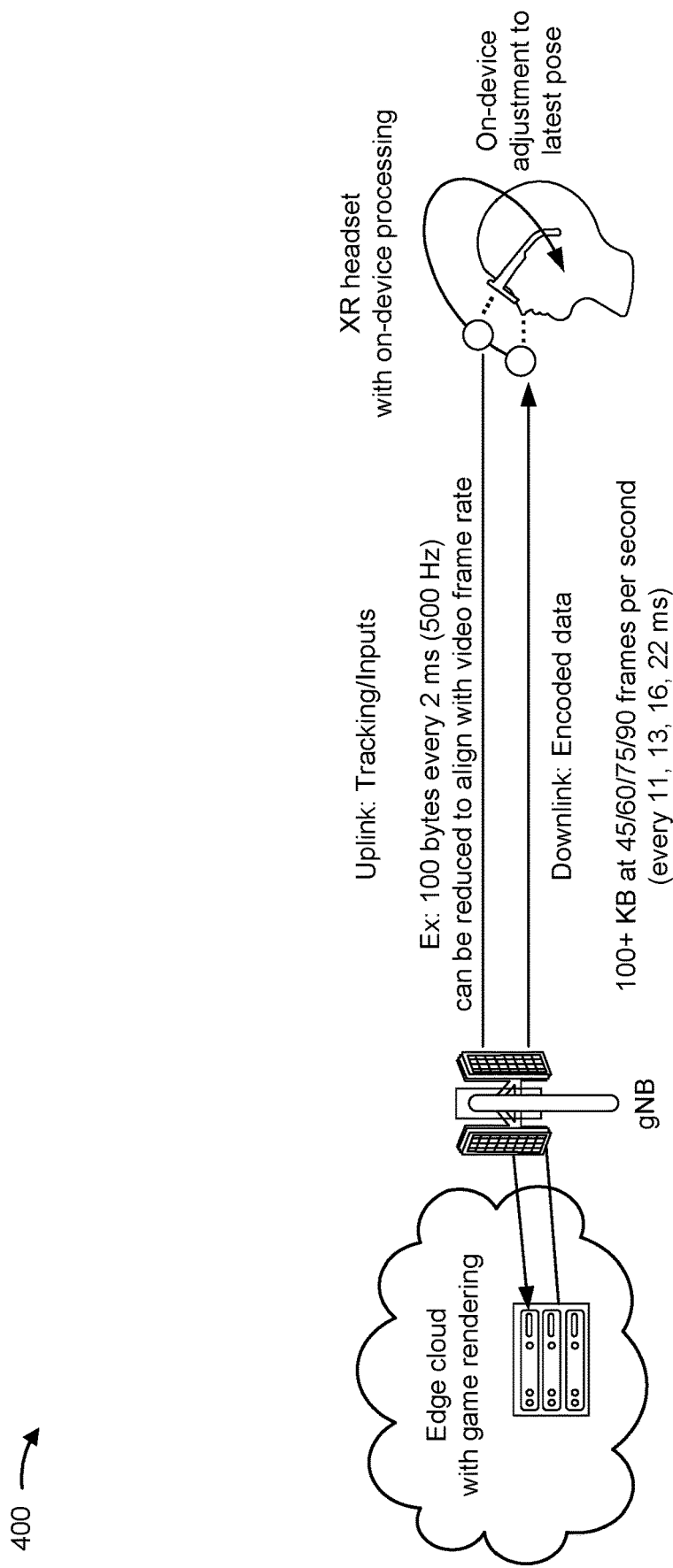
FIG. 4 is a diagram illustrating an example of low-latency traffic and power states, in accordance with the present disclosure.

FIG. 4 is a diagram illustrating an example 400 of low-latency traffic and power states, in accordance with the present disclosure.

Power dissipation may be reduced by limiting an amount of time that processing resources of the XR device are active for computations and power consumption. Some wireless communications systems may a support a UE, such as the XR device, that operates in a DRX mode. A UE in a DRX mode may transition between a sleep state for power conservation and an active state for data transmission and reception. The active state for data transmission and reception may be referred to as a DRX "ON-duration." A UE that uses different DRX cycles may have non-uniform cycle durations within a DRX time period. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information (DCI) or a medium access control (MAC) control element (MAC CE)).

By offloading some computations to an edge server, an XR device may save processing resources. Example 400 shows a scenario where an XR device may split computations for an application with the edge server on the other side of a network node. The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources. XR downlink traffic (e.g., video frames) may have a periodic pattern that corresponds to a frame rate of transmitted video data (e.g., H.264/H.265 encoded video). Such downlink traffic may be quasi-periodic with a data burst every frame at one frame-per-second (1/fps), or two possibly staggered "eye-buffers" per frame at 1/(2*fps). For example, XR downlink traffic may include 100+ kilobytes (KB) of data for 45, 60, 75, or 90 frames per second (e.g., every 11 milli-seconds (ms), 13 ms, 16 ms, or 22 ms). XR uplink traffic may include controller information for gaming, information for VR split rendering, and/or the user pose information. The XR uplink traffic may include 100 bytes every 2 ms (500 Hz). The XR device may reduce this periodicity to align the XR uplink traffic with the XR downlink traffic.

For low-latency applications, the DRX cycle and a start offset of a DRX cycle are to be time-aligned to downlink traffic arrivals. For example, the XR device may serve the user and enter a brief sleep state in a DRX cycle and do so between video frames. The XR device and the edge server may attempt to align the uplink and downlink DRX cycles as part of connected DRX (CDRX). However, there are DRX-multimedia timing mismatches that prevent such alignment and that prevent successful use of CDRX. For example, an update rate may be, for example, 120 Hz or 60 Hz, thus resulting in a downlink traffic burst arrival periodicity of 8.333 ms or 16.667 ms, respectively. However, conventional DRX configurations may have one millisecond as the finest granularity for a DRX cycle, and the start of the ON-duration may be aligned to millisecond time boundaries. These partial millisecond differences may compound with each instance of a period to misalign the DRX cycle and the XR traffic periodicity. For example, the XR traffic period may drift to a middle of the DRX cycle. This causes an increase in latency and power consumption.

As indicated above, FIG. 4 is provided as an example. Other examples may differ from what is described with regard to FIG. 4.

Figure 5:
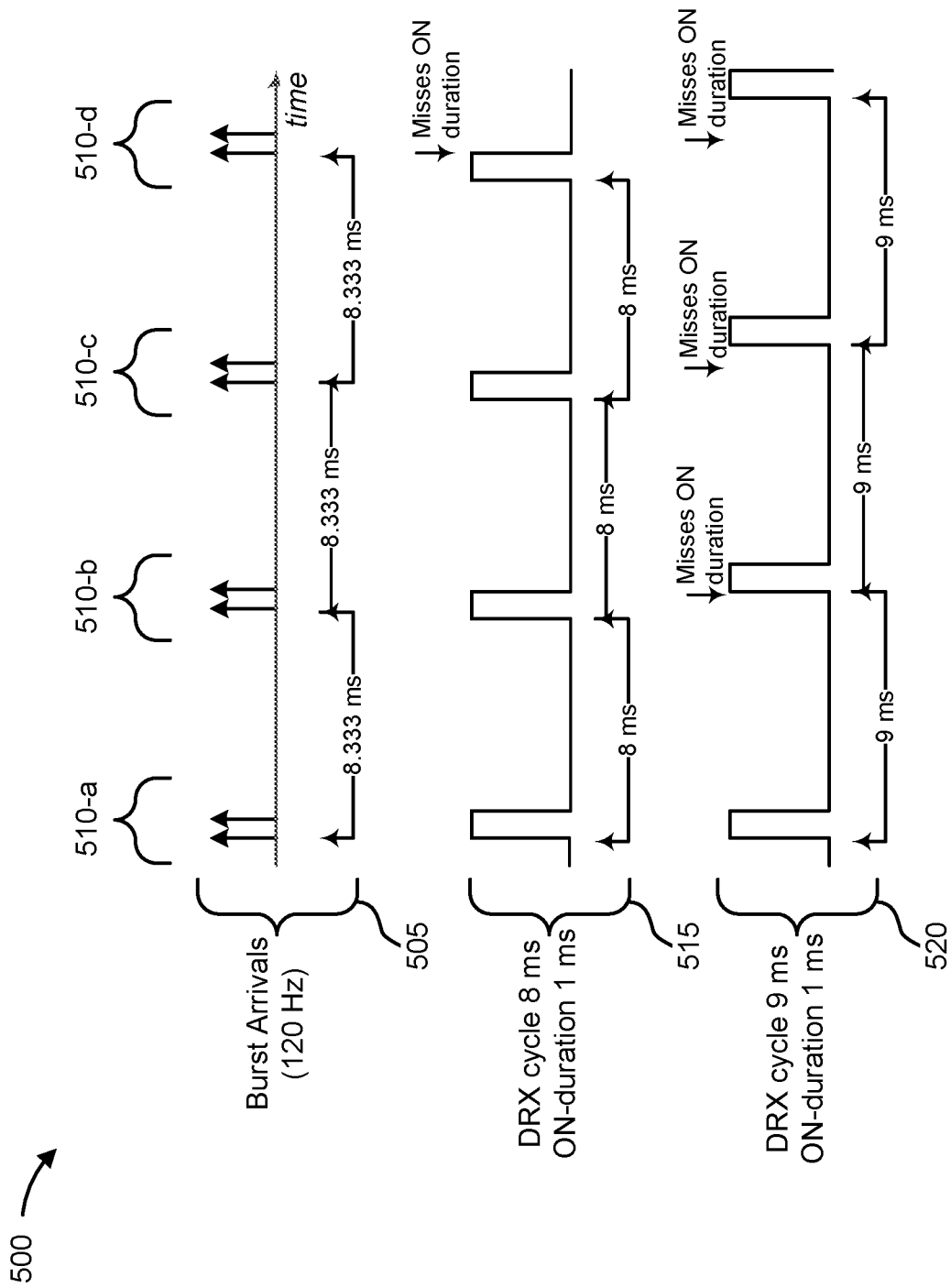
FIG. 5 illustrates an example of a misalignment of a discontinuous reception (DRX) cycle and extended reality traffic periodicity, in accordance with the present disclosure.

FIG. 5 illustrates an example 500 of a misalignment of a DRX cycle and XR traffic periodicity, in accordance with the present disclosure. Example 500 shows downlink traffic burst arrivals 505 that may include a number of downlink traffic bursts 510 that are transmitted according to a periodic pattern. Example 500 also shows a first conventional DRX configuration 515 and a second conventional DRX configuration 520.

The downlink traffic bursts 510 may include, for example, XR downlink traffic with a periodic pattern that corresponds to a frame rate of transmitted data (e.g., H.264/H.265 encoded video). An update rate may be, for example, 120 Hz or 60 Hz, thus resulting in a downlink traffic burst arrival periodicity of 8.333 ms or 16.667 ms, respectively. However, the first conventional DRX configuration 515 and the second conventional DRX configuration 520 may have one millisecond as the finest granularity for a DRX cycle, and the start of the ON-duration may be aligned to millisecond time boundaries.

In the example of FIG. 5, a 120 Hz update rate is illustrated for burst arrivals 505, thus resulting in an 8.333 ms periodicity for the downlink traffic bursts 510. In the event that the first conventional DRX configuration 515 is selected and an initial DRX cycle has an ON-duration that is aligned with the first downlink traffic burst 510-*a*, the second downlink traffic burst 510-*b* and the third downlink traffic burst 510-*c* will each also be within the subsequent two ON-durations. However, the fourth downlink burst 510-*d* would miss the fourth ON-duration, as it would occur 0.333 seconds after the end of the fourth ON-duration. If the second conventional DRX configuration 520 were to be selected instead, the result would be that the first downlink traffic burst 510-*a* would be aligned with an ON-duration, but subsequent downlink traffic bursts 510-*b*, 510-*c*, and 510-*d* would each miss the ON-duration.

Further, if the DRX configuration were to be modified to have a finest granularity corresponding to a slot or symbol, such misalignments may continue to occur due to the burst arrivals 505 having a periodicity that is not a multiple of a slot or symbol duration. For example, as the traffic burst interval (120 Hz or 60 Hz) expressed in milliseconds has a factor of 3 in the denominator, which cannot divide into the numerator (i.e., 1000/120=X/3, where X is an integer such as 25 for a 120 Hz update rate or 50 for 60 Hz update rate). More generally, if DRX cycle granularity can be defined in slots, the expression would be the number of slots in a second divided by the source update rate in Hz. Misalignments between the downlink traffic bursts 510 and ON-durations may add additional latency to communications, where the additional latency is cyclic. For example, in a first missed ON-duration of an 8 ms DRX configuration, the downlink traffic burst may be retransmitted at a next ON-duration, which occurs 7 ms later than the missed ON-duration. Subsequent downlink traffic bursts will have a lower latency, which reduces by 0.333 ms each cycle, until the downlink traffic bursts are again aligned with ON-durations in 21 cycles, with such alignment lasting for three cycles. Thus, the alignment and misalignment of downlink traffic bursts in such an example would be cyclic with a period of 24 cycles, and an average latency of about 3 ms. In some cases, to reduce the latency, the DRX cycle duration may be reduced, which also has a corresponding increase in power consumption due to the extra ON-durations. As a result, the XR device may consume additional processing resources.

As indicated above, FIG. 5 is provided as an example. Other examples may differ from what is described with regard to FIG. 5.

Figure 6:
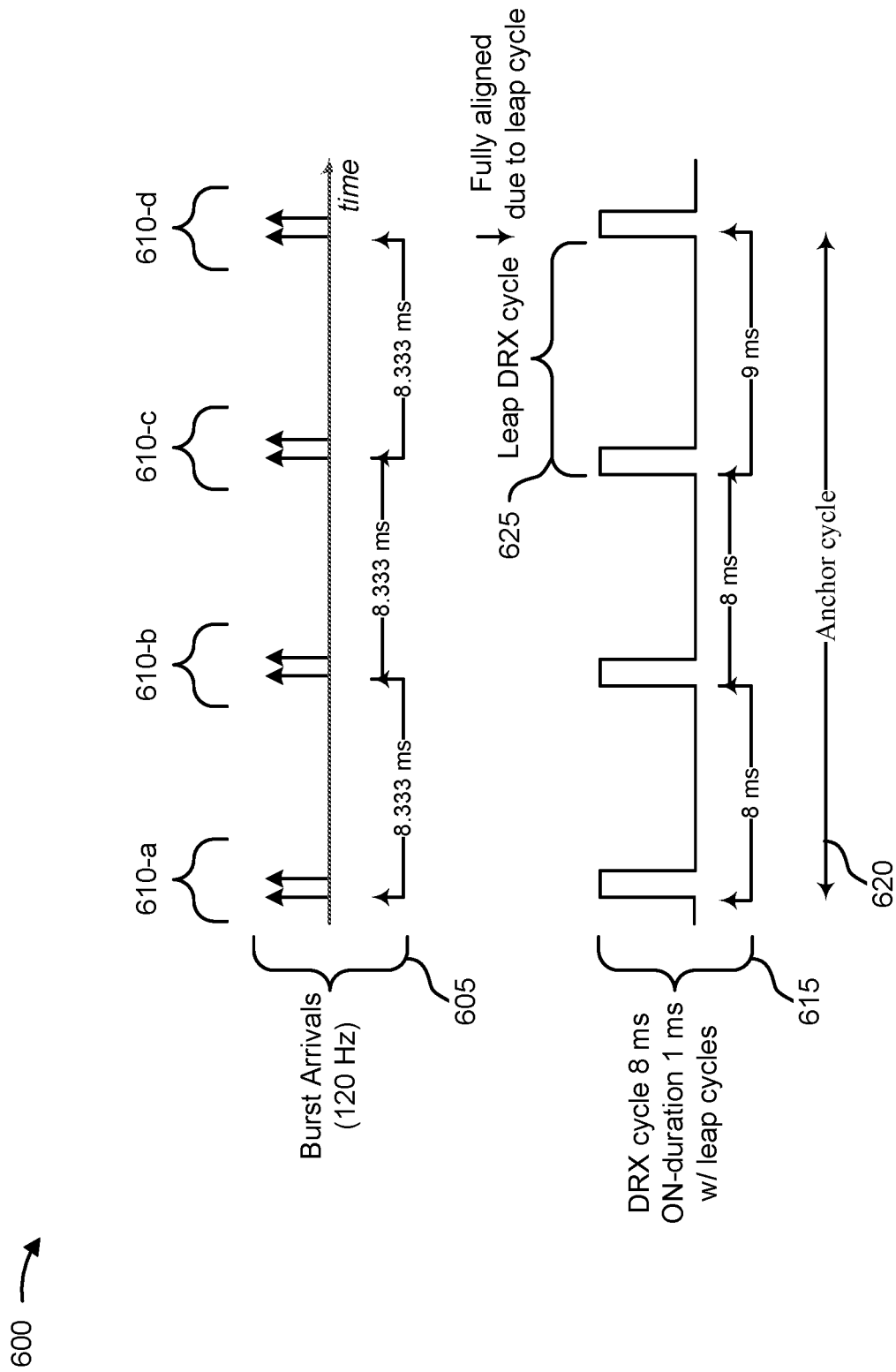
FIG. 6 illustrates an example of an anchor cycle with a leap DRX cycle, in accordance with the present disclosure.

FIG. 6 illustrates an example 600 of an anchor cycle with a leap DRX cycle, in accordance with the present disclosure.

In some scenarios, a UE (e.g., XR device) and the network may use an anchor cycle with a leap DRX cycle to better align the DRX cycle to reduce latency and conserve energy consumption. For example, the UE and the network may implement an anchor cycle with a leap DRX cycle. Downlink traffic burst arrivals 605 may include a number of downlink traffic bursts 610 that are transmitted according to a periodic pattern. The downlink traffic bursts 610 may include, for example, XR downlink traffic that has a periodic pattern with a downlink traffic bursts 610 every 8.333 ms, for example. An anchor cycle 620 may, for example, span three DRX cycles 615, and the third DRX cycle may be a leap cycle 625 that has a longer cycle duration than the initial two DRX cycles. In some cases, the anchor cycle 620, which may be an example of a DRX period, may span more or fewer DRX cycles, and may include one or more leap cycles 625. The anchor cycle 620 may be used as a basis for determining timing for radio resource management (RRM) functions. In some cases, the leap cycle 625 may include one or more additional slots than other DRX cycles of the anchor cycle 620. The position of the leap cycle(s) 625 can be varied within the anchor cycle 620. While example 600 shows burst arrivals 605 associated with periodic traffic having a 120 Hz update rate and the anchor cycle 620 includes three DRX cycles with durations of 8 ms, 8 ms, and 9 ms, other configurations may be used for different periodicities or patterns of downlink traffic. For example, for periodic traffic with a 60 Hz update rate, an anchor cycle with three DRX cycles of 16 ms, 17 ms, 17 ms may be configured, or the three DRX cycles may have durations of 16 ms, 16 ms, 18 ms, respectively. The order of the leap cycle(s) 625 among the DRX cycles within the anchor cycle 620 may also be configured. For example, for 120 Hz update rate, DRX cycles with duration of (8 ms, 8 ms, 9 ms), (8 ms, 9 ms, 8 ms), or (9 ms, 8 ms, 8 ms) can be configured. Support for such varied options in the ordering may help with offsetting multiple users in time for their respective ON-durations, in order to better distribute utilization of resources over time.

In some cases, a network node may configure a UE with a DRX configuration via radio resource control (RRC) signaling. For example, a network node may identify that periodic traffic is being transmitted to the UE (e.g., based on XR application traffic having a certain update rate, or based on historical downlink burst transmissions to the UE), and that the periodic traffic does not align with slot or subframe boundaries. The network node may determine the anchor cycle duration (e.g., based on a number of periods of the downlink traffic bursts 610 that correspond to millisecond time boundaries, such as three 8.333 ms periods that provide a 25 ms anchor cycle duration), a number of DRX cycles within the anchor cycle 620, and which of the DRX cycles are to have different cycle durations. In some cases, the RRC signaling may indicate the anchor cycle duration in milliseconds, the number of DRX cycles in the anchor cycle, and the cycle duration of each DRX cycle (e.g., 8, 8, 9). In some cases, the UE may signal to the network node that the UE has a capability to perform DRX procedures with non-uniform DRX cycles, and the network node may enable the capability when providing the DRX configuration. In other cases, non-uniform DRX cycles may be configured using other techniques, such as by adjusting a starting offset of an ON-duration of a DRX cycle, as discussed in connection with FIG. 7.

As indicated above, FIG. 6 is provided as an example. Other examples may differ from what is described with regard to FIG. 6.

Figure 7:
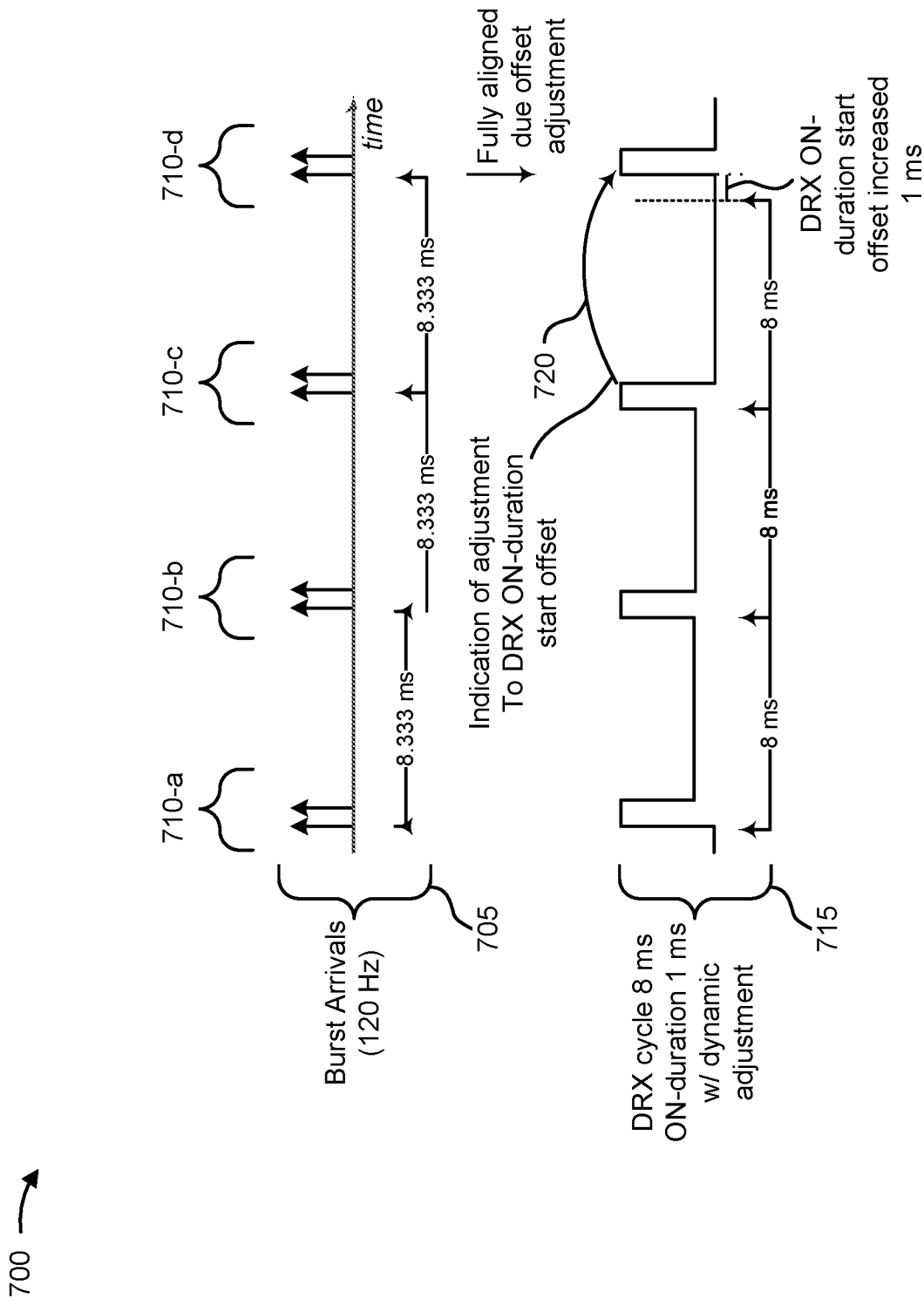
FIG. 7 illustrates an example of a DRX configuration with dynamic offset adjustment that supports DRX techniques with non-uniform cycle durations, in accordance with the present disclosure.

FIG. 7 illustrates an example 700 of a DRX configuration with dynamic offset adjustment that supports DRX techniques with non-uniform cycle durations, in accordance with the present disclosure. Example 700 shows downlink traffic burst arrivals 705 that include a number of downlink traffic bursts 710 that are transmitted according to a periodic pattern. Example 700 also shows a DRX configuration 715 with non-uniform cycle durations.

The downlink traffic bursts 710 may include, for example, XR downlink traffic that has a periodic pattern with a downlink traffic bursts 710 every 8.333 ms. In example 700, DRX configuration 715 has a configuration with an 8 ms DRX cycle duration and a 1 ms ON-duration. In the initial DRX cycles of the downlink traffic bursts 710, the ON-duration may have a zero millisecond offset, such that the first downlink traffic burst 710-*a*, the second downlink traffic burst 710-*b*, and the third downlink traffic burst 710-*c* are aligned with ON-durations. A UE may make an adjustment 720 to the DRX ON-duration start offset following the third downlink burst 710-*c*, which may increase the ON-duration start offset by one millisecond in this example, such that the adjusted DRX ON-duration is aligned with the fourth downlink traffic burst 710-*d*. The UE may make another adjustment to the ON-duration offset back to the original offset following the fourth downlink traffic burst 710-*d*, and thus the DRX cycles may be configured to align ON-durations with downlink traffic bursts 710.

In some cases, the DRX ON-duration start offset adjustment can be predefined based on a specification, or defined in the DRX configuration (e.g., that is provided in RRC signaling). For example, different types of traffic (e.g., XR traffic) and different periodicities (e.g., based on a 120 Hz or 60 Hz update rate) DRX starting offsets may be defined according to a pattern such as in example 700 (e.g., every 4th DRX cycle has a 1 ms starting offset added). In some cases, the DRX starting offset may be dynamically indicated (e.g., based on MAC CE or DCI) in a prior downlink transmission.

As indicated above, FIG. 7 is provided as an example. Other examples may differ from what is described with regard to FIG. 7.

Figure 8:
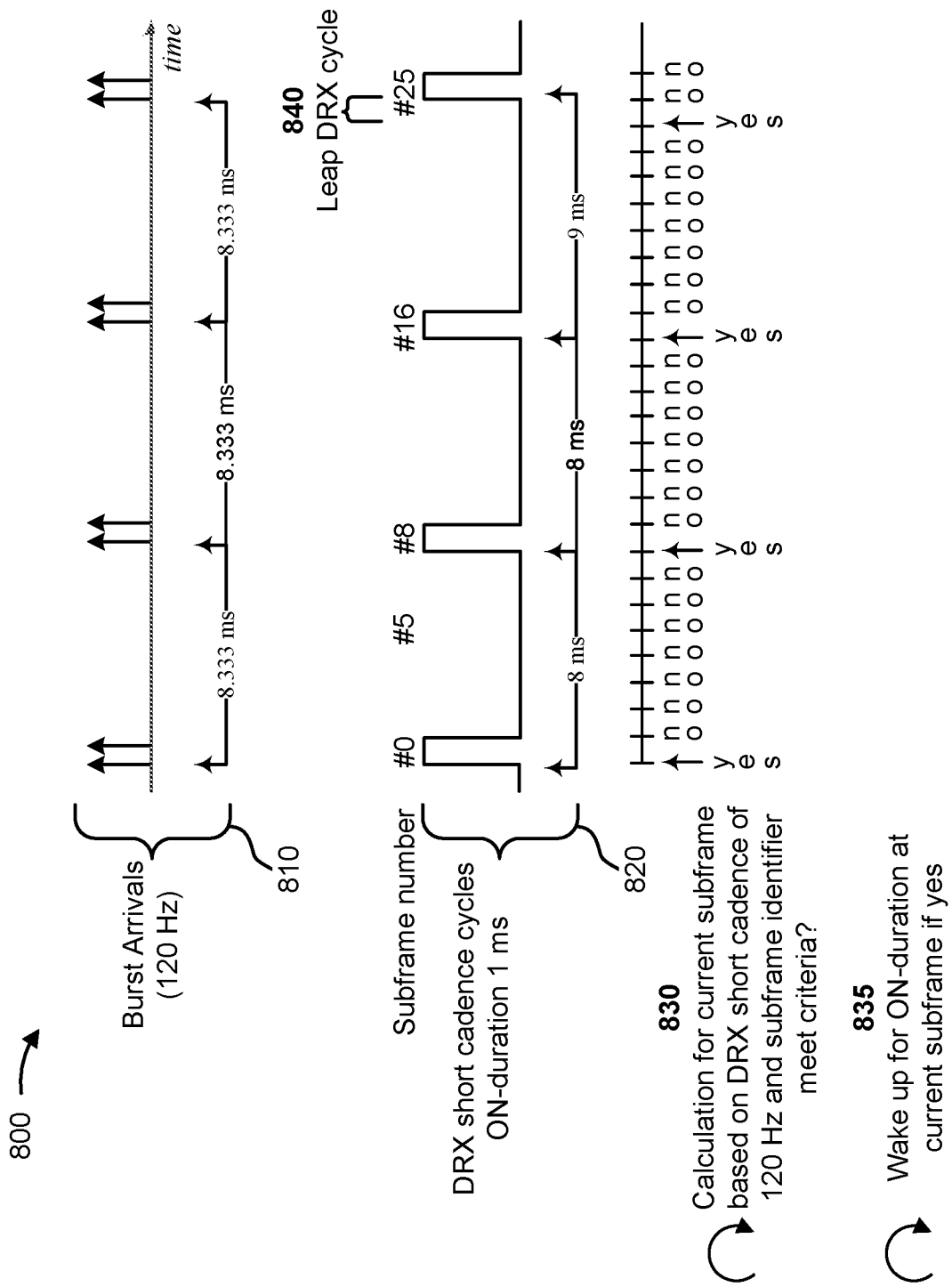
FIG. 8 is a diagram illustrating an example of using a short cadence value for DRX, in accordance with the present disclosure.

FIG. 8 is a diagram illustrating an example 800 of using a short cadence value for DRX, in accordance with the present disclosure. Example 800 shows traffic burst arrivals 810 that are arriving at a rate of 120 Hz.

The techniques described in connection with FIGS. 3-7 may improve alignment of DRX cycles and XR traffic to reduce mismatches between burst traffic and DRX ON-duration times. However, according to various aspects described herein, a UE (e.g., an XR device) and the network may further improve such alignment by using a DRX short cadence that corresponds to a number of Hz (e.g., instances per second) rather than an integer ms value. The DRX short cadence value may correspond to a number of Hz, for example, by being defined by a number of Hz or by being defined by a value that is based on or derived from a number of Hz or a similar or related unit. The DRX short cadence (drx-ShortCadence) may be, for example, 45 Hz, 60 Hz, 90 Hz, or 120 Hz, so as to align ON-duration times of the UE with traffic bursts that are received by the UE according to a video frame rate. That is, the DRX short cadence value may be a DRX timing value that corresponds to a same time unit or frequency unit by which traffic bursts are received by the UE (e.g., video frame rate). Once the network node (e.g., gNB) obtains the frame rate of traffic bursts to the UE, or the periodicity of the traffic bursts to the UE, the network node may set the DRX short cadence value. The UE may receive the DRX short cadence value from the network node or obtain the DRX short cadence value based at least in part on the frame rate or the periodicity of the traffic.

The UE may use the DRX short cadence value to determine when to wake up for an ON-duration and decode physical downlink control channel (PDCCH) grants from the network node, as part of DRX short cadence cycles 820. The UE may determine when to wake up subframe by subframe, or slot by slot. For example, as shown by reference number 830, the UE may calculate, in the first part of a current subframe (having a subframe identifier n), whether specific criteria are satisfied for the current subframe. The criteria may be associated with the DRX short cadence value and subframe identifiers and may be designed such that subframes (or slots) that satisfy the condition align with a timing of the frame rate or the periodicity of the traffic bursts received by the UE. Each subframe may be 1 ms and include multiple slots (e.g., 2, 6, 8). The criteria may be associated with a system frame number (SFN). For a subframe with subframe identifier n=[(SFN*10)+subframe number], the UE may wake up if a first ceiling value (smallest integer higher than calculated value) of (n*drx-ShortCadence/1000)+1 is equal to a second ceiling value of ((n+1)*(drx-ShortCadence/1000)). The SFN may be a number between 0 and 1023 of a frame, and the subframe number may be a number between 0 and 9 within the frame. For example, if the DRX cadence value is 120 Hz and the subframe has a subframe number of 5 in a frame with an SFN of 800, a subframe identifier n for the subframe may be (800*10)+5, or 8005. A first ceiling value may be a smallest integer of (8005*120/1000)+1, or 961. A second ceiling value may be a smallest integer of (8005+1)*(120/1000), or 960. The first ceiling value and the second ceiling value are not equal, and thus the UE does not satisfy the criteria and wake up for this subframe. However, a later subframe with a subframe number of 8, may render a first ceiling value of 961 (smallest integer of (8008*120/1000)+1) and a second ceiling value of 961 (smallest integer of (8008+1)*(120/1000)), and thus the UE may satisfy the criteria and wake up during that subframe. The calculation may be performed at the start of each subframe. In some aspects, multiple calculations for multiple subframes may be made at one time.

In other words, the UE may satisfy some type of criteria that is associated with the DRX short cadence (corresponding to Hz) and a subframe identifier of the subframe that uniquely identifies the subframe among consecutive subframes within a cycle or time period. The criteria, or whatever is calculated for a given subframe, may be designed to use the DRX short cadence to wake up for subframes according to a frame rate or a periodicity of the traffic bursts received by the UE.

As shown by reference number 835, the UE may wake up for an ON-duration at the current subframe. When the UE wakes up, the UE may start a DRX ON-duration timer (drx-onDurationTimer). The DRX ON-duration timer may be a minimum time duration that the UE is to be awake and may be, for example, 1 ms or 2 ms. For example, if the UE wakes up at subframe 8, and the DRX ON-duration timer is 2 ms, the UE may stay awake through subframes 8 and 9. If there is no more traffic, the UE may go back to sleep. In example 800, the DRX ON-duration timer is 1 ms. The DRX ON-duration timer may be started for a DRX group.

In some aspects, there may be a leap of 1 subframe every specified number of cycles, similar to the leap-cycle technique described in connection with FIG. 6. For example, for a cycle of 8 ms, there may be a leap of 1 subframe (1 ms) every 3 cycles to accommodate the ⅓ subframe part when the duty cycle is 8.333 ms for 120 Hz. That is, for a DRX short cadence of 120 Hz, the UE may determine to wake up for subframe n=8, 16, 25, 33, 41, 50, and so forth. As shown by reference number 840, after waking up at subframes 8 and 16, instead of subframe 24, the UE may leap 1 subframe to wake up at subframe 25. If example 800 were to continue to show ON-duration subframes, the UE may then wake up 8 ms later at subframe 33, and another 8 ms later at subframe 41. Instead of waking up 8 ms later at subframe 49, the UE may leap 1 subframe and wake up at subframe 50. In some aspects, the UE may skip calculations for one or more subframes after an ON-duration until the next possible ON-duration approaches.

In some aspects, the UE may use a DRX start offset and/or a DRX slot offset to provide for more granularity as to when to wake up within a subframe, in order to more closely align with the traffic periodicity of the UE. The UE may wake up and start a DRX ON-duration timer after a DRX start offset (drx-StartOffset) from a beginning of the subframe (n+drx-StartOffset) and/or a DRX slot offset (drx-SlotOffset). The DRX start offset may be a number of time units (e.g., ms or microseconds (µs)) (or set to zero ms or µs for no DRX start offset), symbols, slots, or mini-slots. The DRX start offset may be used to stagger multiple UEs in time. The DRX slot offset may be a number of slots. For example, if there are 8 slots in a subframe (such as for mmWave), each slot is 125 µs or 0.125 ms. If the DRX slot offset is 2 slots, the wake up time is shifted (2*0.125) or 0.250 ms. If wake up times, according to 120 Hz, were 8 ms, 16 ms, 25 ms, 33 ms, 41 ms, 50 ms, and so forth, the UE may use the DRX slot offset to better match the traffic bursts at 8.33 ms, 16.66 ms, and 25 ms by using a DRX slot offset of 2 slots at subframe 8 for 8.250 ms, a DRX slot offset of 5 slots at subframe 16 for 16.625 ms, no DRX slot offset at subframe 25 for 25.000 ms, and so forth, such as shown by the table for 120 Hz in FIG. 8. As a result, the UE may better align the DRX cycle and the traffic period to further reduce latency and conserve signaling resources.

As indicated above, FIG. 8 is provided as an example. Other examples may differ from what is described with regard to FIG. 8.

In some aspects described herein, a network node may transmit, and a UE may receive, indication of a rational number for a DRX cycle periodicity. For example, the UE may receive an indication of a configuration for a DRX cycle periodicity that includes a selection of a non-integer number (e.g., a non-integer rational number) of the DRX cycle periodicity. The UE may apply a modulo operation and/or a floor operation or ceiling operation as part of a formula for determining reception occasions associated with the DRX cycle periodicity. In this way, the non-integer number may be used to determine a start offset (e.g., a preliminary time) and the UE may adjust timing for the DRX reception occasions to RAN-based timing units (e.g., slots). Based at least in part on applying a floor operation or a ceiling operation to the non-integer number, timing between reception occasions associated with the DRX cycle periodicity may not be uniform. In this way, the UE may be configured to wake up at reception occasions that correspond to traffic that is configured for transmission to the UE with a non-integer periodicity. This may improve UE performance, latency of the traffic, error rates, and/or may conserve computing, network, and/or power resources by supporting a DRX mode that allows the UE to receive the traffic according to the non-integer periodicity rather than having the UE communicate in an RRC connected mode. Additionally, using the non-integer number with a ceiling or floor operation may reduce overhead needed to explicitly indicate a non-uniform DRX cycle periodicity and/or an indication of a leap DRX cycle.

In some aspects described herein, a network node may transmit, and a UE may receive, an indication of a rational number for a communication cycle periodicity. For example, the communication cycle periodicity may include a periodicity associated with resources for channel state information reference signals (CSI-RSs), CSI interference-measurement (IM), SRSs, scheduling requests SRs, PDCCH monitoring occasions, PUCCH resources, CSI reports, buffer status reports (BSRs), synchronization signal blocks (SSBs), random access channel (RACH) resources, SSB-based measurement timing configuration (SMTC) resources, semi-persistent-scheduling (SPS) resources, and/or configured grants (CGs), among other examples. The UE may receive an indication of a configuration for a communication cycle periodicity that includes a selection of a non-integer number (e.g., a non-integer rational number) of the communication cycle periodicity. The UE may apply a modulo operation and/or a floor operation or ceiling operation as part of a formula for determining reception occasions associated with the communication cycle periodicity. In this way, the non-integer number may be used to determine a start offset (e.g., a preliminary time), and the UE may adjust timing for the communication occasions to RAN-based timing units (e.g., slots). Based at least in part on applying a floor operation or a ceiling operation to the non-integer number, timing between communication occasions (e.g., transmission occasions and/or reception occasions) associated with the communication cycle periodicity may not be uniform. In this way, the UE may be configured to attempt to receive or transmit at occasions that correspond to traffic that is configured for communication with the UE with a non-integer periodicity. This may improve UE performance, latency of the traffic, error rates, and/or may conserve computing, network, and/or power resources by supporting a communication mode that allows the UE to receive or transmit traffic according to the non-integer periodicity. Additionally, using the non-integer number with a ceiling or floor operation may reduce overhead needed to explicitly indicate a non-uniform communication cycle periodicity and/or an indication of a leap communication cycle.

Figure 9:
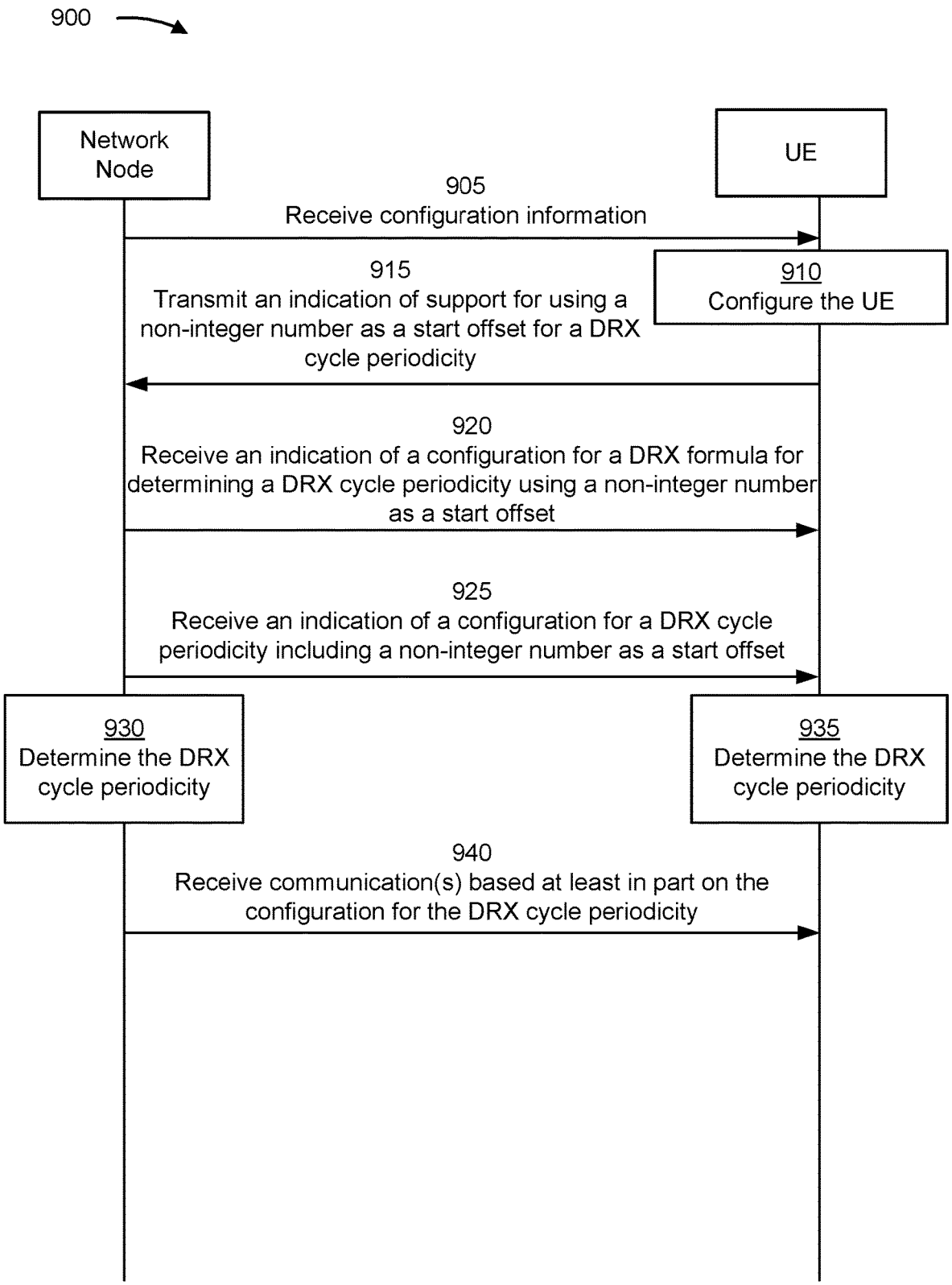
FIG. 9 is a diagram illustrating an example associated with discontinuous reception cycle periodicity, in accordance with the present disclosure.

FIG. 9 is a diagram illustrating an example 900 of low-latency traffic and power states, in accordance with the present disclosure. As shown in FIG. 9, a network node (e.g., network node 110) may communicate with a UE (e.g., UE 120). In some aspects, the network node and the UE may be part of a wireless network (e.g., wireless network 100). The UE and the network node may have established a wireless connection prior to operations shown in FIG. 9. FIG. 9 describes aspects in context of a DRX cycle, a DRX cycle periodicity, and DRX reception occasions, among other DRX-based communication parameters. Although FIG. 9 describes examples using DRX-based communications, the operations described herein may also be applied to other types of periodic communications, such as CSI-RS, CSI-IM, SRSs, SRs, PDCCH monitoring occasions, PUCCH resources, CSI reports, BSRs, SSBs, RACH resources, SMTC resources, SPS resources, and/or CGs, among other examples.

As shown by reference number 905, the network node may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of support for selectively using a non-integer number (e.g., a non-integer rational number) for a DRX cycle periodicity. In some aspects, the configuration information may indicate a formula for determining a DRX cycle periodicity. Additionally, or alternatively, the configuration information may indicate a set of candidate formulas from which a formula may be selected for one or more communications.

As shown by reference number 910, the UE may configure the UE based at least in part on the configuration information. In some aspects, the UE may be configured to perform one or more operations described herein based at least in part on the configuration information.

As shown by reference number 915, the UE may transmit, and the network node may receive, an indication of support for using a non-integer number as a start offset for a DRX cycle periodicity for one or more communications. In some aspects, the UE may transmit the indication of support via RRC signaling (e.g., as part of an RRC connection process). In some aspects, the UE may support using a non-integer number for a DRX cycle periodicity based at least in part on the UE having been configured with a formula, or set of candidate formulas, that can be used to determine when to start a DRX on duration timer (e.g., drx-onDurationTimer) when an indicated start offset is a non-integer number.

As shown by reference number 920, the UE receive, and the network node may transmit, an indication of a configuration for a DRX formula for determining a DRX cycle periodicity using a non-integer number as a start offset. In some aspects, the UE may receive the indication of the configuration for the DRX formula via RRC signaling. For example, the UE may receive the indication of the configuration for the DRX formula via the configuration information described in connection with reference number 905 or via a DRX information RRC message, among other examples. In some aspects, the configuration for the DRX cycle periodicity is associated with a short cycle DRX or a long cycle DRX.

In some aspects, the indication of the configuration for the DRX formula includes an indication of a ceiling operation or a floor operation to apply in a DRX formula for determining the DRX cycle periodicity. The UE may be configured to use only the floor operation, only the ceiling operation, or either of the floor operation or ceiling operation as indicated by the network node. In some aspects, the DRX formula includes a modulo operation configured to be performed on the non-integer number. In some aspects, the ceiling operation or the floor operation and/or the modulo operation may be used to determine a subframe for the DRX cycle. The subframe may be a reference time for a DRX reception occasion (e.g., when a DRX on duration timer initiates).

In some aspects, a DRX formula for a short DRX cycle may include:

ceiling{[(SFN×10)+subframe number]modulo($drx$-ShortCycle)}−ceiling{($drx$-StartOffset)modulo ($drx$-ShortCycle)} and the DRX on duration timer may start after drx-SlotOffset from a beginning of an indicated subframe.

In some aspects, a DRX formula for a long DRX cycle may include:

ceiling{[(SFN×10)+subframe number]modulo($drx$-LongCycle)}=$drx$-StartOffset and the DRX on duration timer may start after drx-SlotOffset from a beginning of an indicated subframe.

These formulas cause the UE to choose a previous subframe for a DRX cycle when multimedia traffic arrives in the middle of a subframe. The modulo operation is a modulo operation for rational numbers. To resolve an SFN wraparound problem and RRC configuration timing ambiguity, this formula may adopt a system counter SFN_M instead of SFN.

In some aspects, a DRX formula for a short DRX cycle may include:

floor{[(SFN×10)+subframe number]modulo($drx$-ShortCycle)}=floor{($drx$-StartOffset)modulo ($drx$-ShortCycle)} and the DRX on duration timer may start after drx-SlotOffset from a beginning of an indicated subframe.

In some aspects, a DRX formula for a long DRX cycle may include:

floor{[(SFN×10)+subframe number]modulo($drx$-LongCycle)}=$drx$-StartOffset and the DRX on duration timer may start after drx-SlotOffset from a beginning of an indicated subframe.

These formulas cause the UE to choose a next subframe for a DRX cycle when multimedia traffic arrives in the middle of a subframe. The modulo operation is a modulo operation for rational numbers. To resolve an SFN wraparound problem and RRC configuration timing ambiguity, this formula may adopt a system counter SFN_M instead of SFN.

In some aspects, a DRX formula for a short DRX cycle may include:

$$\text{ceiling}\{[(SFN \times 10) + \text{subframe number} + 1]\text{modulo}(drx\text{-ShortCycle})\} = \text{ceiling}\{(drx\text{-StartOffset} + 1)\text{modulo}(drx\text{-ShortCycle})\}$$

and the DRX on duration timer may start after drx-SlotOffset from a beginning of an indicated subframe.

In some aspects, a DRX formula for a long DRX cycle may include:

$$\text{ceiling}\{[(SFN \times 10) + \text{subframe number} + 1]\text{modulo}(drx\text{-LongCycle})\} = drx\text{-StartOffset} + 1$$

and the DRX on duration timer may start after drx-SlotOffset from a beginning of an indicated subframe.

These formulas cause the UE to choose a previous subframe for a DRX cycle when multimedia traffic arrives in the middle of a subframe. The modulo operation is a modulo operation for rational numbers. To resolve an SFN wrap-around problem and RRC configuration timing ambiguity, this formula may adopt a system counter SFN_M instead of SFN.

In some aspects, a DRX formula for a short DRX cycle may include:

$$\text{floor}\{[(SFN \times 10) + \text{subframe number} - \text{drxStartOffset}]\text{modulo}(drx\text{-ShortCycle})\} = 0$$

and the DRX on duration timer may start after drx-SlotOffset from a beginning of an indicated subframe.

In some aspects, a DRX formula for a long DRX cycle may include:

$$\text{floor}\{[(SFN \times 10) + \text{subframe number} - drx\text{-StartOffset}]\text{modulo}(drx\text{-LongCycle})\} = 0$$

and the DRX on duration timer may start after drx-SlotOffset from a beginning of an indicated subframe.

These formulas cause the UE to choose a next subframe for a DRX cycle when multimedia traffic arrives in the middle of a subframe. The modulo operation is a modulo operation for rational numbers. To resolve an SFN wrap-around problem and RRC configuration timing ambiguity, this formula may adopt a system counter SFN_M instead of SFN.

As shown by reference number 925, the UE may receive, and the network node may transmit, an indication of a configuration for a DRX cycle periodicity including a non-integer number as a start offset. For example, the indication of the configuration for the DRX cycle periodicity may indicate a selection of the non-integer number for the DRX cycle periodicity. In some aspects, the UE may receive the indication of the configuration for the DRX formula described in connection with reference number 920 along with (e.g., in a same message as) the indication of the configuration for the DRX cycle periodicity.

In some aspects, the DRX cycle periodicity is based at least in part on a rational number expression of a multimedia periodicity associated with the one or more communications. For example, the DRX cycle periodicity may be associated with a multimedia cadence (e.g., expressed in hertz) so the UE is configured to receive traffic for a multimedia application while in DRX mode.

As shown by reference number 930, the network node may determine the DRX cycle periodicity based at least in part on the start offset. Determining the DRX cycle periodicity may include determining timing of reception occasions (e.g., on duration timers) for the UE. In some aspects, timing between reception occasions associated with the DRX cycle periodicity is not uniform. For example, a DRX reception occasion associated with the DRX cycle periodicity occurs at a time that is an integer number of RAN-based timing units (e.g., subframes or slots, among other examples) from a previous DRX reception occasion.

Applying the ceiling operation or the floor operation on the non-integer number may allow the network node and the UE to determine the timing between reception occasions to include a leap DRX cycle without explicit signaling of the leap DRX cycle. For example, a start offset for the DRX reception occasion may be based at least in part on being the non-integer number from the previous DRX reception occasion or a start offset for the previous DRX reception occasion. The time at which the DRX reception occasion occurs is based at least in part on the time being an integer number of RAN-based timing units (e.g., subframes or slots, among other examples) that precedes the start offset, the integer number of RAN-based timing units that follows the start offset, or overlapping with start offset.

In some aspects, a time for a DRX reception occasion associated with the DRX cycle periodicity is based at least in part on a start offset for a DRX reception occasion, with the start offset for the DRX reception occasion is based at least in part on being the non-integer number from a previous DRX reception occasion or a start offset for the previous DRX reception occasion. The time for the DRX reception occasion may be further based at least in part on application of the ceiling operation or the floor operation to the start offset for the DRX reception occasion. The DRX formula for determining the DRX cycle periodicity may indicate to apply the ceiling operation as a single ceiling operation or to apply the floor operation as a single floor operation to determine the DRX cycle periodicity and a start offset. In some aspects, the DRX formula for determining the DRX cycle periodicity may indicate to apply the modulo operation as a single modulo operation to determine the DRX cycle periodicity and a start offset.

In some aspects, the start offset may be adjusted based at least in part on addition to, or subtraction from, a start offset for the DRX reception occasion. Based at least in part on adjusting the start offset (e.g., by adding 1 or subtracting 1), the adjusted offset may indicate any subframe within a frame for the DRX reception occasion.

As shown by reference number 935, the UE may determine the DRX cycle periodicity based at least in part on the start offset. The UE may determine the DRX cycle periodicity in a similar manner to the network node. For example, the UE may determine the DRX cycle periodicity including determining timing of reception occasions for the UE. In some aspects, timing between reception occasions associated with the DRX cycle periodicity is not uniform. For example, a DRX reception occasion associated with the DRX cycle periodicity occurs at a time that is an integer number of RAN-based timing units from a previous DRX reception occasion.

Applying the ceiling operation or the floor operation on the non-integer number may allow the network node and the UE to determine the timing between reception occasions to include a leap DRX cycle without explicit signaling of the leap DRX cycle. For example, a start offset for the DRX reception occasion may be based at least in part on being the non-integer number from the previous DRX reception occasion or a start offset for the previous DRX reception occasion. The time at which the DRX reception occasion occurs is based at least in part on the time being an integer number of RAN-based timing units that precedes the start offset, the integer number of RAN-based timing units that follows the start offset, or overlapping with start offset.

In some aspects, a time for a DRX reception occasion associated with the DRX cycle periodicity is based at least in part on a start offset for a DRX reception occasion, with the start offset for the DRX reception occasion based at least in part on being the non-integer number from a previous DRX reception occasion or a start offset for the previous DRX reception occasion. The time for the DRX reception occasion may be further based at least in part on application of the ceiling operation or the floor operation to the start offset for the DRX reception occasion. The DRX formula for determining the DRX cycle periodicity may indicate to apply the ceiling operation as a single ceiling operation or to apply the floor operation as a single floor operation to determine the DRX cycle periodicity and a start offset. In some aspects, the DRX formula for determining the DRX cycle periodicity may indicate to apply the modulo operation as a single modulo operation to determine the DRX cycle periodicity and a start offset.

In some aspects, the start offset may be adjusted based at least in part on addition to, or subtraction from, a start offset for the DRX reception occasion. Based at least in part on adjusting the start offset (e.g., by adding 1 or subtracting 1), the adjusted offset may indicate any subframe within a frame for the DRX reception occasion.

As shown by reference number 940, the UE may receive the one or more communications based at least in part on the configuration for the DRX cycle periodicity.

As indicated above, FIG. 9 is provided as an example. Other examples may differ from what is described with regard to FIG. 9.

Figure 10:
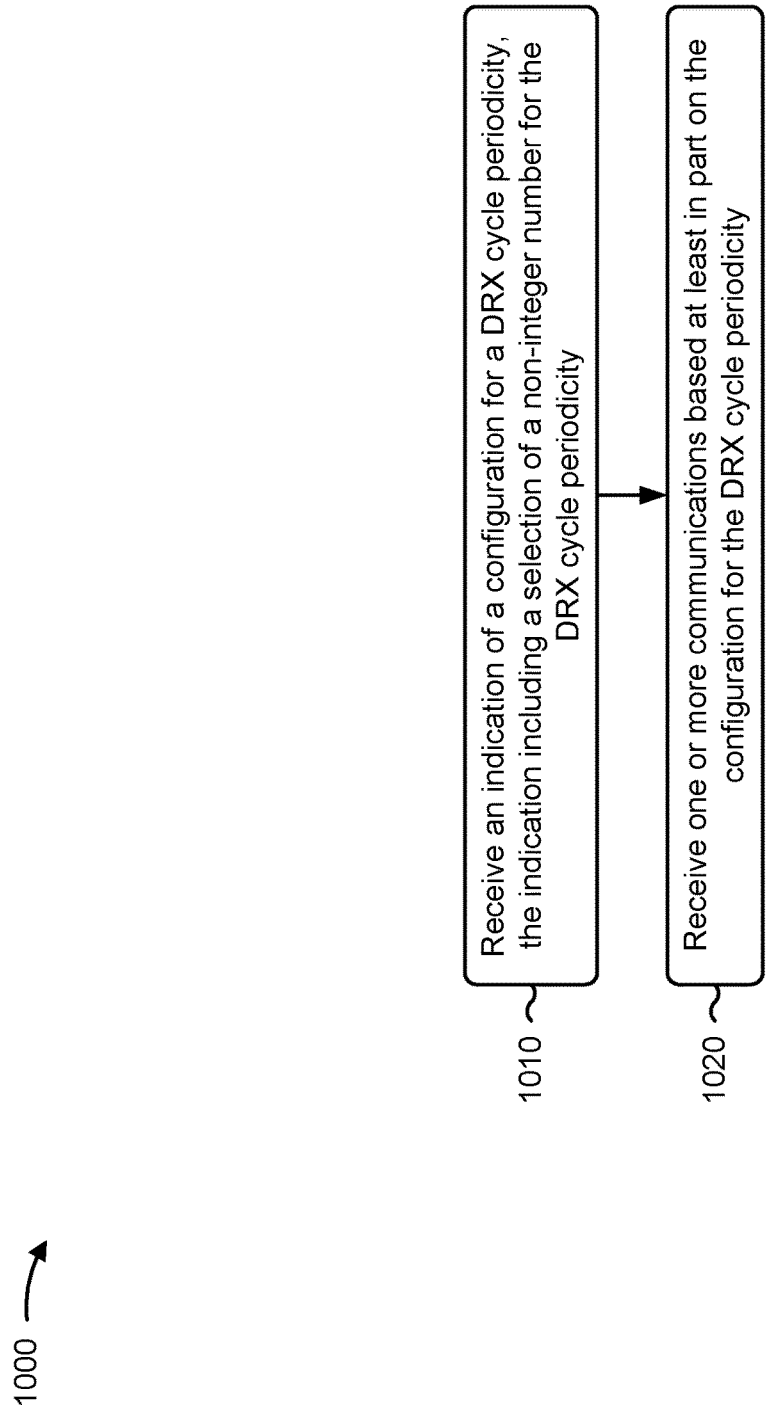
FIGS. 10 and 11 are diagrams illustrating example processes associated with discontinuous reception cycle periodicity, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with DRX cycle periodicity.

As shown in FIG. 10, in some aspects, process 1000 may include receiving an indication of a configuration for a DRX cycle periodicity, the indication including a selection of a non-integer number for the DRX cycle periodicity (block 1010). For example, the UE (e.g., using communication manager 140 and/or reception component 1202, depicted in FIG. 12) may receive an indication of a configuration for a DRX cycle periodicity, the indication including a selection of a non-integer number for the DRX cycle periodicity, as described above.

As further shown in FIG. 10, in some aspects, process 1000 may include receiving one or more communications based at least in part on the configuration for the DRX cycle periodicity (block 1020). For example, the UE (e.g., using communication manager 140 and/or reception component 1202, depicted in FIG. 12) may receive one or more communications based at least in part on the configuration for the DRX cycle periodicity, as described above.

Process 1000 may include additional aspects, such as any single aspect or any combination of aspects described below and/or in connection with one or more other processes described elsewhere herein.

In a first aspect, the indication includes an indication of a ceiling operation or a floor operation to apply in a DRX formula for determining the DRX cycle periodicity.

In a second aspect, alone or in combination with the first aspect, the ceiling operation or the floor operation indicates a subframe or a slot for the DRX cycle, wherein the subframe or the slot is a reference time for a DRX reception occasion.

In a third aspect, alone or in combination with one or more of the first and second aspects, the DRX formula includes a modulo operation configured to be performed on the non-integer number.

In a fourth aspect, alone or in combination with one or more of the first through third aspects, a time for a DRX reception occasion associated with the DRX cycle periodicity is based at least in part on an adjusted start offset for a DRX reception occasion that is based at least in part on addition to, or subtraction from, a start offset for the DRX reception occasion, wherein the start offset for the DRX reception occasion is based at least in part on being the non-integer number from a previous DRX reception occasion or a start offset for the previous DRX reception occasion, and application of the ceiling operation or the floor operation to the adjusted start offset for the DRX reception occasion.

In a fifth aspect, alone or in combination with one or more of the first through fourth aspects, process 1000 includes applying the ceiling operation as a single ceiling operation or applying the floor operation as a single floor operation to determine the DRX cycle periodicity and a start offset.

In a sixth aspect, alone or in combination with one or more of the first through fifth aspects, process 1000 includes applying a single modulo operation to determine the DRX cycle periodicity and a start offset.

In a seventh aspect, alone or in combination with one or more of the first through sixth aspects, timing between reception occasions associated with the DRX cycle periodicity is not uniform.

In an eighth aspect, alone or in combination with one or more of the first through seventh aspects, a DRX reception occasion associated with the DRX cycle periodicity occurs at a time that is an integer number of RAN-based timing units from a previous DRX reception occasion.

In a ninth aspect, alone or in combination with one or more of the first through eighth aspects, a start offset for the DRX reception occasion is based at least in part on being the non-integer number from the previous DRX reception occasion or a start offset for the previous DRX reception occasion, and wherein the time at which the DRX reception occasion occurs is based at least in part on the time being one of an integer number of RAN-based timing units that precedes the start offset, the integer number of RAN-based timing units that follows the start offset, or overlapping with start offset.

In a tenth aspect, alone or in combination with one or more of the first through ninth aspects, DRX cycle periodicity is based at least in part on a rational number expression of a multimedia periodicity associated with the one or more communications.

In an eleventh aspect, alone or in combination with one or more of the first through tenth aspects, the receiving the indication of the configuration for the DRX cycle periodicity comprises receiving the indication via RRC signaling or a MAC CE command.

In a twelfth aspect, alone or in combination with one or more of the first through eleventh aspects, the configuration for the DRX cycle periodicity is associated with a short cycle DRX or a long cycle DRX.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
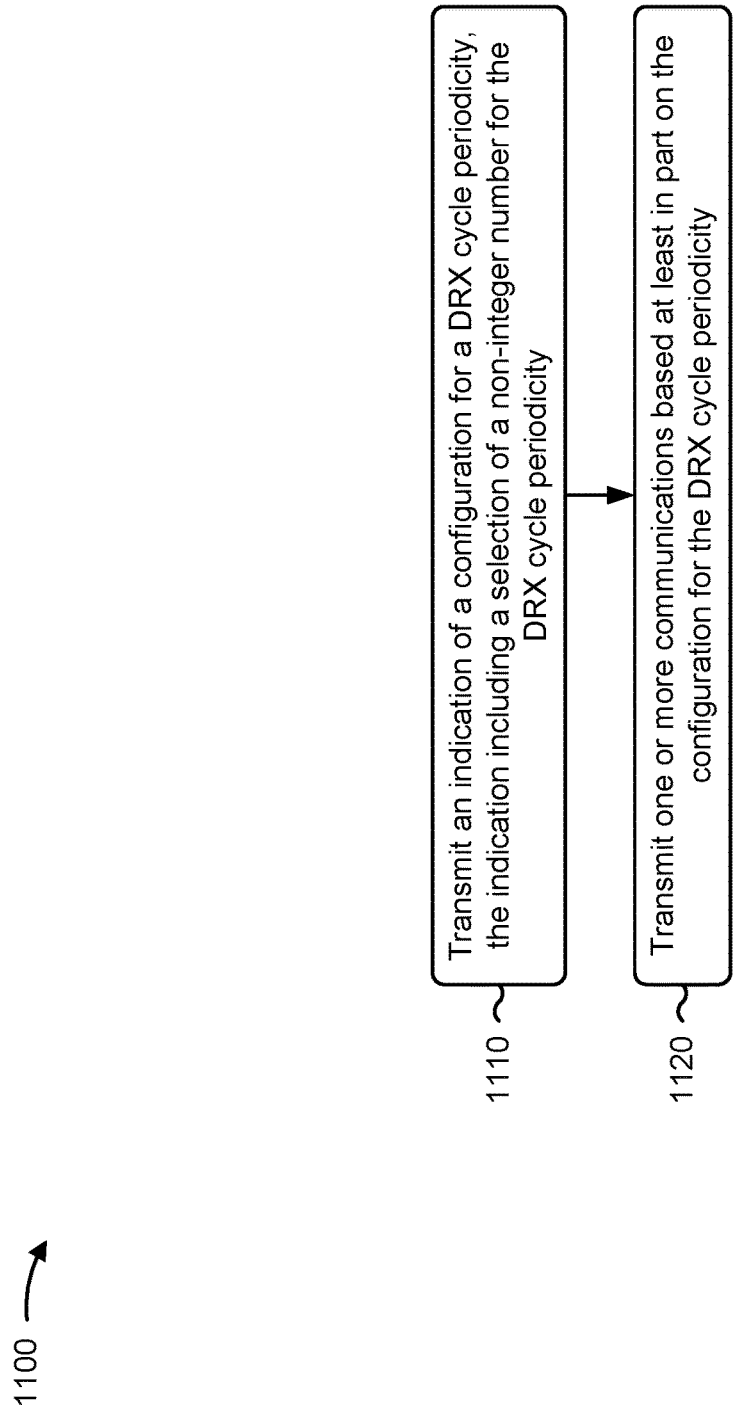

FIG. 11 is a diagram illustrating an example process 1100 performed, for example, by a network node, in accordance with the present disclosure. Example process 1100 is an example where the network node (e.g., network node 110) performs operations associated with DRX cycle periodicity.

As shown in FIG. 11, in some aspects, process 1100 may include transmitting an indication of a configuration for a DRX cycle periodicity, the indication including a selection of a non-integer number for the DRX cycle periodicity (block 1110). For example, the network node (e.g., using communication manager 150 and/or transmission component 1304, depicted in FIG. 13) may transmit an indication of a configuration for a DRX cycle periodicity, the indication including a selection of a non-integer number for the DRX cycle periodicity, as described above.

As further shown in FIG. 11, in some aspects, process 1100 may include transmitting one or more communications based at least in part on the configuration for the DRX cycle periodicity (block 1120). For example, the network node (e.g., using communication manager 150 and/or transmission component 1304, depicted in FIG. 13) may transmit one or more communications based at least in part on the configuration for the DRX cycle periodicity, as described above.

Process 1100 may include additional aspects, such as any single aspect or any combination of aspects described below and/or in connection with one or more other processes described elsewhere herein.

In a first aspect, the indication includes an indication of a ceiling operation or a floor operation to apply in a DRX formula for determining the DRX cycle periodicity.

In a second aspect, alone or in combination with the first aspect, the ceiling operation or the floor operation indicates a subframe or a slot for the DRX cycle, wherein the subframe or the slot is a reference time for a DRX reception occasion.

In a third aspect, alone or in combination with one or more of the first and second aspects, the DRX formula includes a modulo operation configured to be performed on the non-integer number.

In a fourth aspect, alone or in combination with one or more of the first through third aspects, a time for a DRX reception occasion associated with the DRX cycle periodicity is based at least in part on an adjusted start offset for a DRX reception occasion that is based at least in part on addition to, or subtraction from, a start offset for the DRX reception occasion, wherein the start offset for the DRX reception occasion is based at least in part on being the non-integer number from a previous DRX reception occasion or a start offset for the previous DRX reception occasion, and application of the ceiling operation or the floor operation to the adjusted start offset for the DRX reception occasion.

In a fifth aspect, alone or in combination with one or more of the first through fourth aspects, process 1100 includes transmitting an indication for a UE to apply the ceiling operation as a single ceiling operation or apply the floor operation as a single floor operation to determine the DRX cycle periodicity and a start offset.

In a sixth aspect, alone or in combination with one or more of the first through fifth aspects, process 1100 includes transmitting an indication for a UE to apply a single modulo operation to determine the DRX cycle periodicity and a start offset.

In a seventh aspect, alone or in combination with one or more of the first through sixth aspects, timing between reception occasions associated with the DRX cycle periodicity is not uniform.

In an eighth aspect, alone or in combination with one or more of the first through seventh aspects, a DRX reception occasion associated with the DRX cycle periodicity occurs at a time that is an integer number of RAN-based timing units from a previous DRX reception occasion.

In a ninth aspect, alone or in combination with one or more of the first through eighth aspects, a start offset for the DRX reception occasion is based at least in part on being the non-integer number from the previous DRX reception occasion or a start offset for the previous DRX reception occasion, and wherein the time at which the DRX reception occasion occurs is based at least in part on the time being one of an integer number of RAN-based timing units that precedes the start offset, the integer number of RAN-based timing units that follows the start offset, or overlapping with start offset.

In a tenth aspect, alone or in combination with one or more of the first through ninth aspects, DRX cycle periodicity is based at least in part on a rational number expression of a multimedia periodicity associated with the one or more communications.

In an eleventh aspect, alone or in combination with one or more of the first through tenth aspects, the transmitting the indication of the configuration for the DRX cycle periodicity comprises transmitting the indication via RRC signaling.

In a twelfth aspect, alone or in combination with one or more of the first through eleventh aspects, the configuration for the DRX cycle periodicity is associated with a short cycle DRX or a long cycle DRX.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
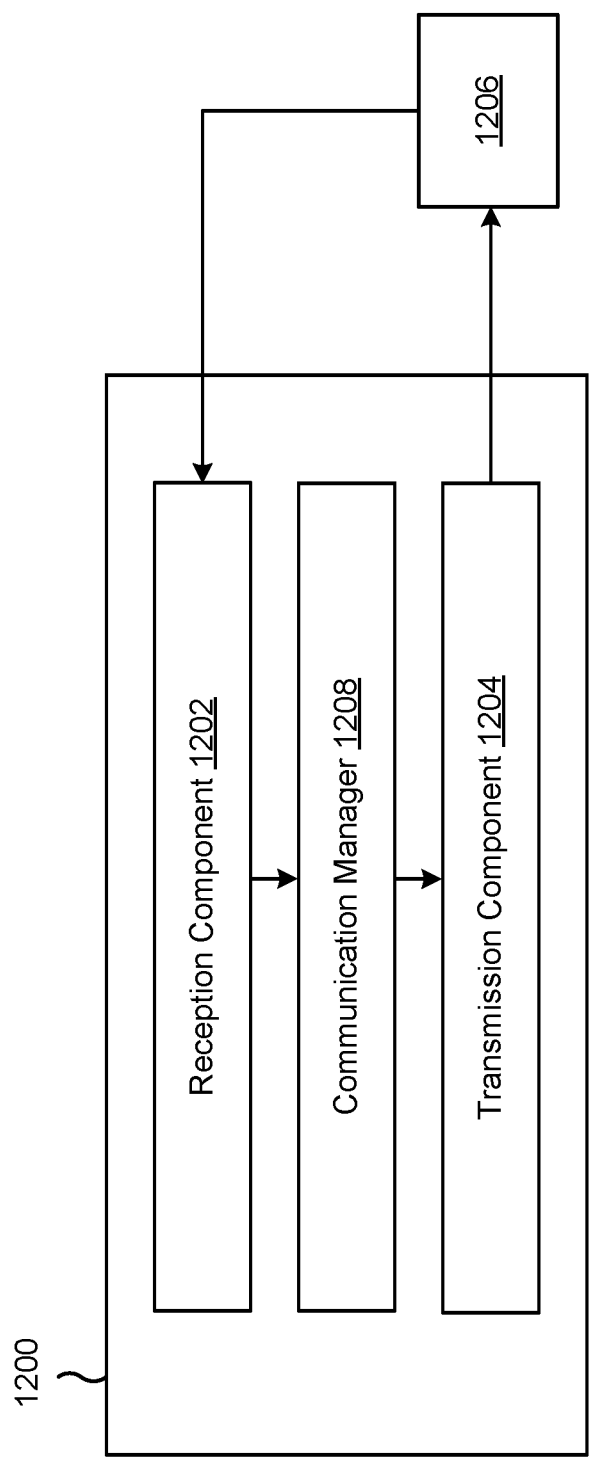
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include a communication manager 1208 (e.g., the communication manager 140).

In some aspects, the apparatus 1200 may be configured to perform one or more operations described herein in connection with FIG. 9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive an indication of a configuration for a DRX cycle periodicity, the indication including a selection of a non-integer number for the DRX cycle periodicity. The reception component 1202 may receive one or more communications based at least in part on the configuration for the DRX cycle periodicity.

The communication manager 1208 may apply the ceiling operation as a single ceiling operation or applying the floor operation as a single floor operation to determine the DRX cycle periodicity and a start offset.

The communication manager 1208 may apply a single modulo operation to determine the DRX cycle periodicity and a start offset.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
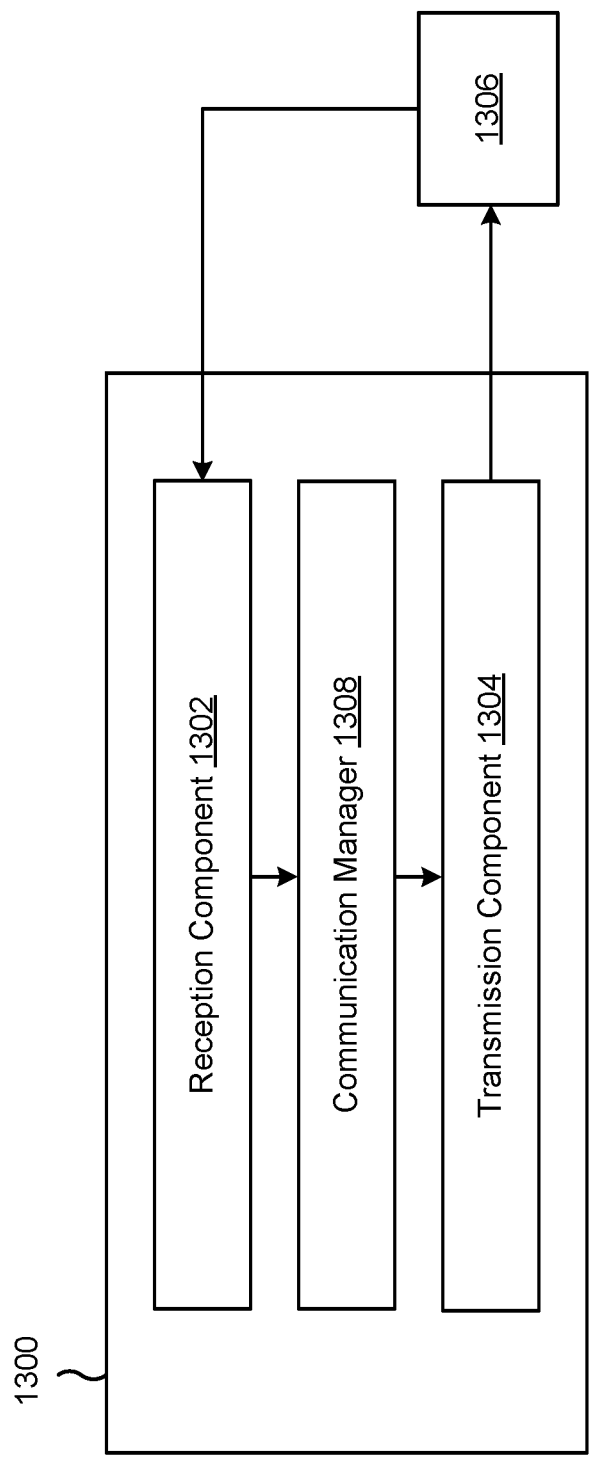

FIG. 13 is a diagram of an example apparatus 1300 for wireless communication. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network node, or another wireless communication device) using the reception component 1302 and the transmission component 1304. As further shown, the apparatus 1300 may include a communication manager 1308 (e.g., the communication manager 150).

In some aspects, the apparatus 1300 may be configured to perform one or more operations described herein in connection with FIG. 9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit an indication of a configuration for a DRX cycle periodicity, the indication including a selection of a non-integer number for the DRX cycle periodicity. The transmission component 1304 may transmit one or more communications based at least in part on the configuration for the DRX cycle periodicity.

The transmission component 1304 may transmit an indication for a UE to apply the ceiling operation as a single ceiling operation or apply the floor operation as a single floor operation to determine the DRX cycle periodicity and a start offset.

The transmission component 1304 may transmit an indication for a UE to apply a single modulo operation to determine the DRX cycle periodicity and a start offset.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving an indication of a configuration for a discontinuous reception (DRX) cycle periodicity, the indication including a selection of a non-integer number for the DRX cycle periodicity; and receiving one or more communications based at least in part on the configuration for the DRX cycle periodicity.

Aspect 2: The method of Aspect 1, wherein the indication includes an indication of a ceiling operation or a floor operation to apply in a DRX formula for determining the DRX cycle periodicity.

Aspect 3: The method of Aspect 2, wherein the ceiling operation or the floor operation indicates a subframe or a slot for the DRX cycle, wherein the subframe or the slot is a reference time for a DRX reception occasion.

Aspect 4: The method of any of Aspects 2-3, wherein the DRX formula includes a modulo operation configured to be performed on the non-integer number.

Aspect 5: The method of any of Aspects 2-4, wherein a time for a DRX reception occasion associated with the DRX cycle periodicity is based at least in part on: an adjusted start offset for a DRX reception occasion that is based at least in part on addition to, or subtraction from, a start offset for the DRX reception occasion, wherein the start offset for the DRX reception occasion is based at least in part on being the non-integer number from a previous DRX reception occasion or a start offset for the previous DRX reception occasion, and application of the ceiling operation or the floor operation to the adjusted start offset for the DRX reception occasion.

Aspect 6: The method of any of Aspects 2-5, further comprising applying the ceiling operation as a single ceiling operation or applying the floor operation as a single floor operation to determine the DRX cycle periodicity and a start offset.

Aspect 7: The method of any of Aspects 2-6, further comprising applying a single modulo operation to determine the DRX cycle periodicity and a start offset.

Aspect 8: The method of any of Aspects 1-7, wherein timing between reception occasions associated with the DRX cycle periodicity is not uniform.

Aspect 9: The method of any of Aspects 1-8, wherein a DRX reception occasion associated with the DRX cycle periodicity occurs at a time that is an integer number of radio access network (RAN)-based timing units from a previous DRX reception occasion.

Aspect 10: The method of Aspect 9, wherein a start offset for the DRX reception occasion is based at least in part on being the non-integer number from the previous DRX reception occasion or a start offset for the previous DRX reception occasion, and wherein the time at which the DRX reception occasion occurs is based at least in part on the time being one of: an integer number of RAN-based timing units that precedes the start offset, the integer number of RAN-based timing units that follows the start offset, or overlapping with start offset.

Aspect 11: The method of any of Aspects 1-9, wherein the DRX cycle periodicity is based at least in part on a rational number expression of a multimedia periodicity associated with the one or more communications.

Aspect 12: The method of any of Aspects 1-11, wherein the receiving the indication of the configuration for the DRX cycle periodicity comprises receiving the indication via RRC signaling or a MAC CE command.

Aspect 13: The method of any of Aspects 1-12, wherein the configuration for the DRX cycle periodicity is associated with a short cycle DRX or a long cycle DRX.

Aspect 14: A method of wireless communication performed by a network node, comprising: transmitting an indication of a configuration for a discontinuous reception (DRX) cycle periodicity, the indication including a selection of a non-integer number for the DRX cycle periodicity; and transmitting one or more communications based at least in part on the configuration for the DRX cycle periodicity.

Aspect 15: The method of Aspect 14, wherein the indication includes an indication of a ceiling operation or a floor operation to apply in a DRX formula for determining the DRX cycle periodicity.

Aspect 16: The method of Aspect 15, wherein the ceiling operation or the floor operation indicates a subframe or a slot for the DRX cycle, wherein the subframe or the slot is a reference time for a DRX reception occasion.

Aspect 17: The method of any of Aspects 15-16, wherein the DRX formula includes a modulo operation configured to be performed on the non-integer number.

Aspect 18: The method of any of Aspects 15-17, wherein a time for a DRX reception occasion associated with the DRX cycle periodicity is based at least in part on: an adjusted start offset for a DRX reception occasion that is based at least in part on addition to, or subtraction from, a start offset for the DRX reception occasion, wherein the start offset for the DRX reception occasion is based at least in part on being the non-integer number from a previous DRX reception occasion or a start offset for the previous DRX reception occasion, and application of the ceiling operation or the floor operation to the adjusted start offset for the DRX reception occasion.

Aspect 19: The method of any of Aspects 15-18, further comprising transmitting an indication for a user equipment (UE) to apply the ceiling operation as a single ceiling operation or apply the floor operation as a single floor operation to determine the DRX cycle periodicity and a start offset.

Aspect 20: The method of any of Aspects 15-19, further comprising transmitting an indication for a user equipment (UE) to apply a single modulo operation to determine the DRX cycle periodicity and a start offset.

Aspect 21: The method of any of Aspects 14-20, wherein timing between reception occasions associated with the DRX cycle periodicity is not uniform.

Aspect 22: The method of any of Aspects 14-21, wherein a DRX reception occasion associated with the DRX cycle periodicity occurs at a time that is an integer number of radio access network (RAN)-based timing units from a previous DRX reception occasion.

Aspect 23: The method of Aspect 22, wherein a start offset for the DRX reception occasion is based at least in part on being the non-integer number from the previous DRX reception occasion or a start offset for the previous DRX reception occasion, and wherein the time at which the DRX reception occasion occurs is based at least in part on the time being one of: an integer number of RAN-based timing units that precedes the start offset, the integer number of RAN-based timing units that follows the start offset, or overlapping with start offset.

Aspect 24: The method of any of Aspects 14-23, wherein the DRX cycle periodicity is based at least in part on a rational number expression of a multimedia periodicity associated with the one or more communications.

Aspect 25: The method of any of Aspects 14-24, wherein the transmitting the indication of the configuration for the DRX cycle periodicity comprises transmitting the indication via RRC signaling.

Aspect 26: The method of any of Aspects 14-25, wherein the configuration for the DRX cycle periodicity is associated with a short cycle DRX or a long cycle DRX.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  receiving an indication of a configuration for a discontinuous reception (DRX) cycle periodicity, the configuration including a selection of a non-integer number for the DRX cycle periodicity;

determining a time for a DRX reception occasion based at least in part on the non-integer number for the DRX cycle periodicity, wherein the determining comprises applying a ceiling operation or a floor operation in a DRX procedure; and receiving one or more communications based at least in part on the DRX reception occasion.

2. The method of claim 1, wherein the configuration includes an indication of the ceiling operation or the floor operation.

3. The method of claim 1, wherein the ceiling operation or the floor operation indicates a subframe or a slot for a DRX cycle, wherein the subframe or the slot is a reference time for the DRX reception occasion.

4. The method of claim 1, wherein the DRX procedure comprises a modulo operation configured to be performed on the non-integer number.

5. The method of claim 1, wherein the DRX reception occasion is a first DRX reception occasion, wherein the time for the first DRX reception occasion is based at least in part on an adjusted start offset for the first DRX reception occasion that is based at least in part on addition to, or subtraction from, a start offset for the first DRX reception occasion, and wherein the start offset for the first DRX reception occasion is based at least in part on being the non-integer number from a second DRX reception occasion or a start offset for the second DRX reception occasion.

6. The method of claim 1, further comprising applying the ceiling operation as a single ceiling operation or applying the floor operation as a single floor operation to determine the DRX cycle periodicity and a start offset.

7. The method of claim 1, further comprising applying a single modulo operation to determine the DRX cycle periodicity and a start offset.

8. The method of claim 1, wherein timing between a set of reception occasions associated with the DRX cycle periodicity is not uniform.

9. The method of claim 1, wherein the DRX reception occasion is a first DRX reception occasion, wherein a start offset for the first DRX reception occasion is based at least in part on being the non-integer number from a second DRX reception occasion or a start offset for the second DRX reception occasion, and wherein the time at which the first DRX reception occasion occurs is based at least in part on the time overlapping with the start offset for the first DRX reception occasion.

10. The method of claim 1, wherein the DRX cycle periodicity is based at least in part on a rational number expression of a multimedia periodicity associated with the one or more communications.

11. The method of claim 1, wherein the receiving the indication of the configuration for the DRX cycle periodicity comprises receiving the indication via radio resource control (RRC) signaling or MAC CE command.

12. The method of claim 1, wherein the configuration for the DRX cycle periodicity is associated with a short cycle DRX or a long cycle DRX.

13. A method of wireless communication performed by a network node, comprising:
transmitting an indication of a configuration for a discontinuous reception (DRX) cycle periodicity, the configuration including a selection of a non-integer number for the DRX cycle periodicity;
determining a time for a DRX reception occasion based at least in part on the non-integer number for the DRX cycle periodicity, wherein the determining comprises applying a ceiling operation or a floor operation in a DRX procedure; and
transmitting one or more communications based at least in part on the DRX reception occasion.

14. The method of claim 13, wherein the configuration includes an indication of the ceiling operation or the floor operation.

15. The method of claim 13, wherein the ceiling operation or the floor operation indicates a subframe or a slot for the DRX cycle, wherein the subframe or the slot is a reference time for the DRX reception occasion.

16. The method of claim 13, wherein the DRX procedure comprises a modulo operation configured to be performed on the non-integer number.

17. The method of claim 13, wherein the DRX reception occasion is a first DRX reception occasion, wherein the time for the first DRX reception occasion is based at least in part on an adjusted start offset for the first DRX reception occasion that is based at least in part on addition to, or subtraction from, a start offset for the first DRX reception occasion, and wherein the start offset for the first DRX reception occasion is based at least in part on being the non-integer number from a second DRX reception occasion or a start offset for the second DRX reception occasion.

18. The method of claim 13, further comprising transmitting an indication for a user equipment (UE) to apply the ceiling operation as a single ceiling operation or apply the floor operation as a single floor operation to determine the DRX cycle periodicity and a start offset.

19. The method of claim 13, further comprising transmitting an indication for a user equipment (UE) to apply a single modulo operation to determine the DRX cycle periodicity and a start offset.

20. The method of claim 13, wherein timing between a set of reception occasions associated with the DRX cycle periodicity is not uniform.

21. The method of claim 13, wherein the DRX reception occasion is a first DRX reception occasion, wherein a start offset for the first DRX reception occasion is based at least in part on being the non-integer number from a second-DRX reception occasion or a start offset for the second DRX reception occasion, and wherein the time at which the first DRX reception occasion occurs is based at least in part on the time overlapping with the start offset for the first DRX reception occasion.

22. The method of claim 13, wherein the DRX cycle periodicity is based at least in part on a rational number expression of a multimedia periodicity associated with the one or more communications.

23. The method of claim 13, wherein the transmitting the indication of the configuration for the DRX cycle periodicity comprises transmitting the indication via RRC signaling or a MAC CE command.

24. The method of claim 13, wherein the configuration for the DRX cycle periodicity is associated with a short cycle DRX or a long cycle DRX.

25. A user equipment (UE) for wireless communication, comprising:
one or more memories; and
one or more processors, coupled to the one or more memories, the one or more memories comprising instructions executable by the one or more processors to cause the UE to:
receive an indication of a configuration for a discontinuous reception (DRX) cycle periodicity, the configuration including a selection of a non-integer number for the DRX cycle periodicity;

determine a time for a DRX reception occasion based at least in part on the non-integer number for the DRX cycle periodicity, wherein the determining comprises applying a ceiling operation or a floor operation in a DRX procedure; and receive one or more communications based at least in part on the DRX reception occasion.

26. The UE of claim 25, wherein the configuration includes an indication of the ceiling operation or the floor operation.

27. A network node for wireless communication, comprising:

one or more memories; and one or more processors, coupled to the one or more memories, the one or more memories comprising instructions executable by the one or more processors to cause the network node to:

transmit an indication of a configuration for a discontinuous reception (DRX) cycle periodicity, the configuration including a selection of a non-integer number for the DRX cycle periodicity;

determine a time for a DRX reception occasion based at least in part on the non-integer number for the DRX cycle periodicity, wherein the determining comprises applying a ceiling operation or a floor operation in a DRX procedure; and transmit one or more communications based at least in part on the DRX reception occasion.

28. The network node of claim 27, wherein the configuration includes an indication of the ceiling operation or the floor operation.

29. The network node of claim 27, wherein the ceiling operation or the floor operation indicates a particular slot for a DRX cycle.

30. The network node of claim 27, wherein the time for the DRX reception occasion is based at least in part on an adjusted start offset for the DRX reception occasion that is based at least in part on addition to, or subtraction from, a start offset for the DRX reception occasion.

* * * * *